US007771752B2

(12) United States Patent
Bartlett et al.

(10) Patent No.: US 7,771,752 B2
(45) Date of Patent: Aug. 10, 2010

(54) ANIMAL FEED SUPPLEMENT FOR THE NUTRITIONAL ENRICHMENT OF ANIMAL PRODUCE

(75) Inventors: Brian Bartlett, Lindfield (AU); John Wingate, Glenorie (AU)

(73) Assignee: Bartlett Grain Pty. Ltd., Chatswood West (AU)

(*) Notice: Subject to any disclaimer, the term of this patent is extended or adjusted under 35 U.S.C. 154(b) by 223 days.

(21) Appl. No.: 11/102,418

(22) Filed: Apr. 8, 2005

(65) Prior Publication Data

US 2005/0266052 A1    Dec. 1, 2005

Related U.S. Application Data

(63) Continuation-in-part of application No. 09/914,274, filed as application No. PCT/AU00/00129 on Feb. 24, 2000, now abandoned.

(30) Foreign Application Priority Data

Feb. 24, 1999    (AU) .................................... PP8873

(51) Int. Cl.
*A61K 36/53*    (2006.01)
*A61K 35/60*    (2006.01)
(52) U.S. Cl. ................. 424/523; 424/747; 424/725; 424/442; 514/458; 514/474
(58) Field of Classification Search ................ None
See application file for complete search history.

(56) References Cited

U.S. PATENT DOCUMENTS

| 5,112,624 | A |   | 5/1992  | Johna et al. |
| 5,130,242 | A |   | 7/1992  | Barclay |
| 5,133,963 | A |   | 7/1992  | Ise |
| 5,505,976 | A | * | 4/1996  | Bland et al. ................ 426/532 |
| 5,540,932 | A |   | 7/1996  | Lanter et al. |
| 5,776,913 | A | * | 7/1998  | Ogilvie et al. ............... 514/57 |
| 5,972,391 | A |   | 10/1999 | Suzuki et al. |
| 6,068,862 | A | * | 5/2000  | Ishihara et al. ................ 426/2 |
| 6,214,337 | B1 | * | 4/2001  | Hayen et al. ............. 424/93.51 |

FOREIGN PATENT DOCUMENTS

| DE | 4327310 A1 | 2/1994 |
| JP | 06209720 A | 8/1994 |

OTHER PUBLICATIONS

Soler-Velasquez et al. (J. Anim. Sci (1998), vol. 76, pp. 110-117).*
O'Keefe, S. F. et al., "Lipid oxidation in meats of omega-3 fatty acid-enriched broiler chickens" *Food Research International*, vol. 28, No. 4, pp. 417-424, 1995.
Howe, P. R. C. "ω3-Enriched Pork" *World Review of Nutrition and Dietetics*, vol. 83, pp. 132-143, 1998.
Mandell, I. B. et al. "Enrichment of Beef with ω3 Fatty Acids" *World Review of Nutrition and Dietetics*, vol. 83, pp. 144-159, 1998.
Roubal, Journal of the American Oil Chemists' Society (1963), vol. 40, pp. 215-218.

* cited by examiner

*Primary Examiner*—Susan C Hoffman
(74) *Attorney, Agent, or Firm*—Greenblum & Bernstein, P.L.C.

(57) ABSTRACT

An animal feed supplement includes fish meal as a source of omega 3 long chain fatty acids for inclusion in the diet of an animal. The animal feed supplement also includes at least one naturally-occurring antioxidant; at least one synthetic antioxidant; an antibacterial agent; an anti-mold/anti-fungal agent; and an anti-chemical activity agent. The omega 3 long chain fatty acids are provided at a level which maximizes the nutritional value of food produce from the animal, but without taint of the food produce. The feed supplement is greater than 5% of the total dietary intake of the animal.

25 Claims, 3 Drawing Sheets

ANIMAL FEED SUPPLEMENT FOR THE NUTRITIONAL ENRICHMENT OF ANIMAL PRODUCE

This application is a continuation-in-part application of U.S. application Ser. No. 09/914,274 filed Dec. 13, 2001, now abandoned, which is a 371 U.S. national stage application of international application PCT/AU00/00129 filed Feb. 24, 2000, which claims priority of Australian patent application no. PP 8873 filed Feb. 24, 1999, the disclosures of which are herein incorporated by reference in their entireties.

BACKGROUND OF THE INVENTION

The present invention relates to nutritional enrichment of foodstuffs such as, but not limited to pork, beef, poultry and the like and more particularly relates to the use of a selection of feed supplements formulated for feeding to animals at predetermined stages of growth and which include increased levels of omega 3 long chain fatty acids. The invention further provides feed formulae for animals at various stages of development and which result in produce having an increased human nutritional quality due to an increased level of long chain omega 3 fatty acids but without taint of the food product. Whilst the supplement and formulae of the present invention are suitable as feed for producing high nutritional quality beef and poultry (in the latter case influencing the nutritional value of poultry meat and eggs) the invention will mainly be described with reference to its application in pig feeding.

It is long established that there is a direct relationship between animal feed and the quality of food produce from a particular animal. An example of this relationship is evident where fish meal is used in pig feeding with the constituent ingredient levels of fish meal impacting on the nutritional quality of the food.

The food industry, in recognition of the desirability of lowering of saturated fats in the human diet has paid particular attention to improvement of the nutritional quality of foodstuffs and this begins with the animal feed blends. For instance, in the last ten years the average fat content of pork has been reduced by more than 50% in direct response to consumer demand for low fat diets in view of the links between high cholesterol, heart disease and a high fat diet. Animal products including pork also contain polyunsaturated fatty acids (PUFA). Pork and animal product producers have in recognition of the high nutritional benefits of long chain omega 3 PUFA and the consequent high consumer demand for foods with high yields of these nutrients have paid particular attention to the sources of these fatty acids and more particularly to ways of fortifying foods with long chain omega 3 PUFA.

Omega 3 polyunsaturated fatty acids, like vitamins, are essential to good health but as the body cannot itself manufacture these essential acids and vitamins it must rely on food sources for the requisite supply of these necessities. Foods rich in long chain omega 3 fatty acids are generally not a regular part of the diet so most people are denied the fill potential benefits of the presence of these in the diet.

Polyunsaturated fats are divided into the omega 3 and omega 6 fatty acids both of which the body needs. The effects of long chain omega 3 fatty acids on the body are significant as they are incorporated into every cell, tissue and organ including the heart and lungs, blood vessels, brain and joints.

There are a variety of food sources of long chain omega 3 fatty acids for example, Alpha-linolenic acid (ALA) occurs in oils such as canola, linseed (flaxseed), walnut and soybean as well as in green vegetables. Eicosapentaenoic acid (EPA) can be found in cod liver oil, fish oils fish and other seafoods and even in beef Docosahexaenoic acid (DMA) is found in tuna oil, other fish oils and in breast milk.

While omega 6 fatty acids are also beneficial and necessary for a good diet, the ratio of omega 6 fatty acids to omega 3 should be less than 5:1 and preferably 1:1. An excess of omega 6 acids can negate the effect of the long chain omega 3 fatty acids. Long chain Omega 3 fatty acids (EPA and DMA) are derived from fish and are more potent than the short chain omega 3 derived from plants (ALA) as they are taken up directly by the cells. The evidence for the health benefits of DMA and EPA in the diet is nowhere better demonstrated than in Japanese fisherman and Eskimos who both have diets high in fish and a low incidence of heart disease. Omega 3 fatty acids also play a role in slowing the build up of fats on the walls of blood vessels, reducing blood clotting, reducing blood pressure and decreasing arythmia. There is also evidence that omega 3 fatty acids can reduce risk of cancer and depression and can strengthen the immune system.

The problem for the food industry has been to determine the most effective means of introducing long chain omega 3 fatty acids into the diet without compromising the physical, textural and sensory quality of the food vehicle. Egg producers introduced long chain omega 3 fatty acids into eggs by feeding hens foods such as fish meal which are high in these acids only to discover that the eggs tasted like fish leading to a reduction in consumption of such fat modified eggs. The hens were then fed a unique vegetarian diet of natural foods that are rich in long chain omega 3 fatty acids but there are significant restrictions on how much fatty acid can be introduced due to the problem of sensory taint. This is also the experience in the pork industry where fish meal has been fed to pigs to increase the level of long chain omega 3 fatty acids in consumers of pork, but the neat has also suffered from fishy taint which significantly reduces the level of omega three fatty acids which can be introduced.

According to conventional wisdom, high intakes by pigs of fishmeal as a source of long chain omega 3 PUFA above relatively low levels of 2-5% of the food vehicle results in pork taint manifested by decrease in oleic acid content, increase in iodine value (hence oxidizability), as well as softening of the carcass fat. Thus there has traditionally in use of PUFA been a necessary compromise between achieving an optimum nutritional value associated with use of PUFA's while guarding against taint from excessive use.

This has kept the use of PUFA's in pig feed to low levels primarily due to the undesirability of taint. The problems of taint and the desirability of increasing the PUFA content in the human diet has been recognised in the industry literature. See for instance the article entitled "Omega 3 Enriched Pork" by Peter R. C. Howe—Department of Biomedical Science, University of Wollongong, NSW, Australia. For an enriched omega 3 product to be regarded as a useful dietary source it should be able to increase the level of omega 3 fatty acids present in the circulation when consumed in reasonable quantities, Although increases have been reported for consumption of omega 3 eggs there has been no similar demonstration of potential benefit to humans with other alternative dietary sources of marine omega 3 fatty acids apart from refined fish oil supplements.

In recognition of the benefits of long chain omega 3 PUFA, the food industry turned its attention to identifying an economic and plentiful source of these acids. Fish oil was considered an obvious source of these fatty acids and experimentation was conducted to determine the levels which could be used in pork recognising that levels above a desirable maximum, could result in taint of the pork.

An industry objective has therefore been to determine the extent of omega 3 PUFA enrichment of animal produce that could be achieved using fish meal without the problems of taint. Experimentation found that only very low percentages 0.8-1.4% of fish oil could be used in the diet and it was found preferable that the use should be terminated or reduced to the lowest levels before slaughter. The experiments demonstrated that increasing fish oil intake increased the percentage of long chain omega 3 PUFA and therefore the nutritional qualities of the produce. It was also found that where diets contained 3% fish oil up to slaughter, the organoleptic quality of the pork was affected. The industry then turned its attention to the use of fish meal as a source of long chain omega 3 PUFA for the enrichment of pork but taint of the physical and sensory qualities of the pork remained a problem. The industry currently recommends that the fish meal content of pig rations not exceed 5% of the total diet and only where the fish meal is withdrawn 5-7 weeks before slaughter. Where the pigs are fed fish meal up to slaughter it is recommended that the level of fish meal in the diet not exceed 3%. The conventional source of fish meal is pelagic fish, which when rendered into meal, normally has an oil content of 6%-9%.

The applicant has for some time (in order to meet the challenge of elimination of taint) been involved in experimentation to determine fish meal formulae for feeding to animals [depending upon the stage of development of the animal to which the food blend is fed] to optimise the retention of omega 3 long chain PUFA but without taint caused by the fish meal through off flavours and rancidity of the produce.

Although experts in the field have postulated as to possible ways to increase the use of fish meal without taint of the produce, no one to date has succeeded in increasing the fishmeal level above 3%-5% of the total diet without risk of taint of the produce. Some in the food industry advise against feeding fish meal at any time during the 14 day period before slaughter to eliminate the possibility of taint.

The August 1998 issue of the organ of the Fishmeal Information Network commissioned an independent study by a pig nutritionist to review the available data on use of fish meal in feeding pigs. The study found that fish meal, provided that it does not exceed 10% oil content, can be fed at up to 7.5% of the diet without presenting any problems of taint in the end product. The findings do however recognise that for 100% security against taint, percentage levels of fish meal in the diet should be set below 7%. Thus it is generally recognised in the industry that it is undesirable to increase the percentage of fishmeal beyond 3%-5% percent to be sure of elimination of taint.

SUMMARY OF THE INVENTION

The present invention seeks to ameliorate or eliminate the aforesaid problems of the prior art relating to taint in produce by providing feed formulae which optimise the level of use of fishmeal in the diet of an animal, above percentages previously achieved and without the problem of taint through off flavours and rancidity. According to one embodiment of the invention, fish meal from cannery scrap of oily fish is used which produce a meal with 11%-13% oil containing approximately one third of omega 3 fatty acids.

In its broadest form the present invention comprises: an animal feed supplement utilising fish meal as a source of omega 3 long chain fatty acids for inclusion in the diet of said animal; wherein, the fatty acids are increased to a level which maximises the nutritional value of the produce from said animal due to increased level of long chain omega 3 fatty acids but without taint of said produce.

In another form the present invention comprises: a fishmeal food supplement for feeding to animals wherein the content of omega 3 long chain fatty acids in animal produce such as pork, eggs poultry meat, beef and farmed fish is maximised to a level which is nutritionally optimal but without taint of the produce; wherein the percentage of fishmeal food supplement is greater than 5% of the total dietary intake of the animal.

The percentage of supplement in the total diet of the animal is greater than 5% and preferably 15% to produce the long chain fatty acids Decosahexaenoic Acid (DFIA), Docosapentaenoic acid (DPA) and Eicosapentaenoic acid (EPA).

In another form of the present invention, an animal feed supplement comprises a) fish meal as a source of omega 3 long chain fatty acids; b) at least one naturally-occurring antioxidant; c) at least one synthetic antioxidant; d) an antibacterial agent; e) an anti-mold/anti-fungal agent; and f) an anti-chemical activity agent. The omega 3 long chain fatty acids are provided at a level which maximises the nutritional value of food produce from an animal but without taint of the food produce. The feed supplement is greater than 5% of the total dietary intake of the animal, for example, about 7%, or about 12%, or about 15%, or about 20%.

In embodiments, the at least one synthetic antioxidant may be tert-butylhydroquinone (TBHQ); butylated hydroxyanisole (bha); butylated hydroxytoluene (bht); Ethoxyquin vitamin grade; Propyl Gallate; Vitamin C (ascorbic acid); Crude palm oil; Crude Canola oil; or combinations thereof. The at least one naturally-occurring antioxidant may be Vitamin E 50, Carotenoids, Vitamin C, Rosemary oil, Thyme white oil, Peppermint oil, Jasmine tea, Sodium Selenite, or combinations thereof. The antibacterial agent may be Potassium Sorbate food acid, Citric Acid food acid, Benzoic Acid food preservative, Phosphoric acid, or combinations thereof. The anti-fungal agent may be calcium propionate. The anti-chemical agent may be Phosphoric Acid (Buffer Modifier); Potassium Sorbate (pH modifier); Citric Acid (pH modifier), or combinations thereof.

Crude Canol oil results from the cold pressing of Canola seed, the oil being sieved to remove any detritis. The crude oil contains the natural antioxidants from the seed and hence is preferred to refined oil which may have reduced natural antioxidants. Crude Canola oil is the preferred carrier for the oil soluble ingredients in an oil based blend. Crude palm oil results from the cold pressing of Palm oil fruit (seed), the oil being sieved to remove the major detritis. This crude oil contains the natural antioxidants from the seed and hence is preferred to refined oil which may contain reduced levels of natural antioxidants. Furthermore, the crude palm oil contains high concentrations of natural carotenes which synergise a stabilising system of antioxidants; these are removed when crude palm oil is refined. The function of crude palm oil is to supply natural antioxidants and natural carotenes to enhance the stabilising system. This is an unconventional function of animal feeds.

In another broad form the present invention comprises food supplement for feeding to animals in which the level of long chain omega 3 is increased to increase the nutritional quality of the animal produce and without taint of the produce; wherein the supplement includes a blend of fish meal, an oil based premix, a dry mix premix and water based green tea extract.

Preferably, the supplement constituents are blended according to the following proportions;

|  | kg | % |
| --- | --- | --- |
| Fish Meal | 983.00 | 98.300 |
| Oil based premix | 10.00 | 1.000 |
| Dry mix Premix | 5.00 | 0.500 |
| Water based green tea | 2.00 | 0.200 |
|  | 1000.00 | 100.000 |

Preferably the oil based premix of the supplement comprises a blend of the following ingredients:

| | |
| --- | --- |
| Ethoxyquin vitamin grade | Crude palm oil |
| Aniseed China Star | Rosemary oil |
| Thyme white oil | Peppermint oil |
| Benzoic Acid | Phosphoric Acid 81% |
| Crude Canola oil Carrier. | |

According to one embodiment, the constituents of the oil based premix per tonne of a food base are blended in the following proportions:

|  | kg | % |
| --- | --- | --- |
| Ethoxyquin vitamin grade | 0.400 | 4.00 |
| Crude palm oil | 1.500 | 15.00 |
| Aniseed China Star | 0.067 | 0.67 |
| Rosemary oil | 0.100 | 1.00 |
| Thyme white oil | 0.100 | 1.00 |
| Peppermint oil | 0.150 | 1.50 |
| Benzoic Acid | 0.005 | 0.05 |
| Phosphoric Acid 81% | 0.250 | 2.50 |
| Crude Canola oil Carrier | 7.428 | 74.28 |
|  | 10.000 | 100.00 |

Preferably, the dry mix premix comprises a blend of the following ingredients:

| | |
| --- | --- |
| Vitamin E 50 | Vitamin C |
| Citric Acid | Propyl Gallate |
| Calcium Propionate | Wheat Meal Carrier |

Preferably, the dry mix premix comprises the following proportion of constituents:

|  | kg | % |
| --- | --- | --- |
| Vitamin E 50 | 0.800 | 16.00 |
| Vitamin C | 0.500 | 10.00 |
| Citric Acid | 0.500 | 10.00 |
| Propyl Gallate | 0.100 | 2.00 |
| Calcium Propionate | 0.500 | 10.00 |
| Wheat Meal Carrier | 2.600 | 52.00 |
|  | 5.000 | 100.00 |

According to a preferred embodiment, the Vitamin C and Citric Acid are scavenger antioxidants. In another broad form the present invention comprises a food supplement for feeding to animals to maximise the level of long chain omega 3 fatty acids in the animal produce and without taint of the produce; wherein the supplement comprises a blend of fish meal, an oil based premix and a drymix premix blended in the following proportions:

|  | kg | % |
| --- | --- | --- |
| Fish Meal | 985.00 | 98.500 |
| Oil based premix | 10.00 | 1.000 |
| Dry mix Premix | 5.00 | 0.500 |
|  | 1000.00 | 100.000 |

In another form the present invention comprises a food supplement for feeding to animals to maximise the level of long chain omega 3 fatty acids in the animal produce and without taint of the produce; wherein the supplement comprises tuna meal, an oil based premix, a dry mix premix, water based green tea extract wherein the supplement includes the following constituents:

| | |
| --- | --- |
| Fish Meal | Ethoxyquin vitamin grade |
| Crude palm oil | Aniseed China Star |
| Rosemary oil | Thyme white oil |
| Peppermint oil | Benzoic Acid |
| Phosphoric Acid 81% | Crude Canola oil Carrier. |
| Vitamin E 50 | Vitamin C |
| Citric Acid | Propyl Gallate |
| Calcium Propionate | Wheat Meal Carrier |

In another broad form the present invention comprises a food supplement for feeding to animals to maximise the level of omega 3 fatty acids in the animal produce and without taint of the produce; wherein the supplement comprises fish meal, an oil based premix, a dry mix premix and water based green tea wherein the fish meal, dry mix premix and oil based premix collectively include the following constituents:

| | |
| --- | --- |
| Tuna Meal | Ethoxyquin vitamin grade |
| Crude palm oil | Rosemary oil |
| Thyme white oil | Peppermint oil |
| Benzoic Acid | Phosphoric Acid 81% |
| Crude Canola oil Carrier. | Vitamin E 50 |
| Vitamin C | Citric Acid |
| Propyl Gallate | |

In another broad form the present invention comprises a food supplement for feeding to animals to maximise the level of omega 3 fatty acids in the animal produce and without taint of the produce; wherein the supplement comprises fish meal, an oil based premix, and a water based green tea extract and a dry mix premix including the following relative proportions of constituents:

|  | % |
| --- | --- |
| Tuna Meal (containing 11%-13% oil) | 98.500 |
| Ethoxyquin vitamin grade | 0.040 |
| Crude palm oil | 0.150 |
| Rosemary oil | 0.010 |
| Thyme white oil | 0.010 |
| Peppermint oil | 0.015 |
| Benzoic Acid | 0.001 |
| Phosphoric Acid 81% | 0.025 |
| Crude Canola oil Carrier. | 0.743 |

-continued

|  | % |
| --- | --- |
| Vitamin E 50 | 0.080 |
| Vitamin C | 0.050 |
| Citric Acid | 0.050 |
| Propyl Gallate | 0.010 |

According to a preferred embodiment, the supplement further comprises the following consituent percentage proportions:

|  | % |
| --- | --- |
| Vanillic Crystals | 0.013 |
| Aniseed China Star | 0.007 |
| Calcium Propionate | 0.050 |
| Wheat Meal | 0.260 |

In another form the present invention comprises a food supplement for feeding to animals to maximise the level of long chain omega 3 fatty acids in the animal produce and without taint of the produce; wherein the supplement comprises fish meal, an oil based premix, a dry mix premix, and water based green tea extract blended in the following proportions per tonne of food base:

|  | kg | % |
| --- | --- | --- |
| Tuna Meal | 985.000 | 98.500 |
| Ethoxyquin vitamin grade | 0.400 | 0.040 |
| Crude palm oil | 1.500 | 0.150 |
| Aniseed China Star | 0.067 | 0.007 |
| Rosemary oil | 0.100 | 0.010 |
| Thyme white oil | 0.100 | 0.010 |
| Peppermint oil | 0.150 | 0.015 |
| Benzoic Acid | 0.005 | 0.001 |
| Phosphoric Acid 81% | 0.250 | 0.025 |
| Crude Canola oil Carrier | 7.428 | 0.743 |
| Vitamin E 50 | 0.800 | 0.080 |
| Vitamin C | 0.500 | 0.050 |
| Citric Acid | 0.500 | 0.050 |
| Propyl Gallate | 0.100 | 0.010 |
| Calcium Propionate | 0.500 | 0.050 |
| Wheat Meal Carrier | 2.600 | 0.260 |
|  | 1000.000 | 100.000 |

The fish meal may be selected from Tuna, Mackerel, Sardine, Pilchard or Anchovies but it will be appreciated that marine fish oil may be derived from other species.

According to the method aspect of the present invention there is provided a method of feeding animals using a fish meal based food supplement with 11%-13% fish oil wherein the supplement comprises at least 5%-20% of the animal's total diet wherein the method comprises the following steps:

a) selecting constituents for a supplement including fish meal, an oil based premix, a dry mix premix and a water based green tea extract b) preparing the dry mix and the oil based premix;

c) blending the constituents in predetermined proportions of the supplement;

d) selecting additives for the supplement appropriate to the stage of development of the animal and blending the additives with the fish meal, oil based premix, dry mix premix and water based green tea extract;

e) feeding an animal with the supplement blended according to the stage of development of the animals selected for feeding so that the food produce from said animals has an optimum level of long chain omega three fatty acids yet is free from taint and wherein the supplement may comprise between 5%-20% of the total diet of the animal.

According to another form of the method aspect of the present invention there is provided a method of feeding animals using a fish meal based supplement at a level within the range of 10%-20% of the animal's total diet, wherein the supplement comprises the following active ingredients:

Tuna Meal
Ethoxyquin vitamin grade
Crude palm oil
Rosemary oil
Thyme white oil
Peppermint oil
Benzoic Acid
Phosphoric Acid 81%
Crude Canola oil Carrier
Vitamin E 50
Vitamin C
Citric Acid
Propyl Gallate wherein the method comprises the following steps:

a) selecting constituents for a supplement including fish meal, an oil based premix, a dry mix premix and a water based green tea extract b) preparing the dry mix and the oil based premix;

c) blending the constituents in predetermined proportions of the supplement;

d) selecting additives for the supplement appropriate to the stage of development of the animal and blending the additives with the fish meal, oil based premix, dry mix premix and water based green tea extract e) feeding an animal with the supplement blended according to the stage of development of the animals selected for feeding so that the food produce from said animals has an optimum level of long chain omega three fatty acids yet is free from taint and wherein the supplement comprises between 5%-20% of the total diet of the animal.

According to a preferred embodiment the method comprises the further step prior to or after blending of the dry mix and fish meal of:

a) preparing the ingredients of said oil emulsion according to the following mixing sequence:

Crude Canola Oil
Crude Palm Oil
Phosphoric Acid 81%
Benzoic Acid
Ethoxyquin Vitamin Grade
Aniseed China Star
Rosemary Oil
Thyme White Oil
Peppermint Oil b) high speed mixing of said ingredients to create a homogeneous stable emulsion.

According to the preferred embodiment, the method includes the following step prior to steps a) and b) last mentioned above of preparing the ingredients according to the following steps:

i) heating to above 50 degrees C. to liquefy the Crude palm oil;

ii) heating to above 22 degrees C. to liquefy the Aniseed china star iii) heating to above 20 degrees C. to liquefy the Crude Canola Oil.

According to a preferred embodiment the method comprises the further step prior to or after blending of the oil emulsion and fish meal of preparing the dry mix by combining the following ingredient sequence:

| | |
|---|---|
| Wheat Meal | Vitamin E 50 |
| Vitamin C | Citric Acid |
| Propyl Gallate | Calcium Propionate |
| Green Tea Powder | Vanillic Crystals |

According to one embodiment of the method aspect, the Oil Emulsion may be applied by fine spray to the Fish (Tuna) meal; the Aqueous Extraction to be applied by fine spray to the Tuna meal; the dry mix to be added to the Tuna meal followed by mixing the whole to produce a homogeneous blend. Nutritional Premixes supplying the Vitamin, Mineral requirements of particular species and stage of life cycle/development may be included in the supplement to satisfy the nutritional completeness of the appropriate supplement.

According to the invention, the feed supplement provides a supply of long chain fatty acids such as DHA, DPA and EPA in contrast to the short chain fatty acids which are obtained from certain vegetable sources. The long chain omega 3 fatty acids will be absorbed directly into the animal body in their existing biological form exerting beneficial physiological change and direct deposition in the blood stream, body cells and fat depots unlike the Short Chain Fatty Acids which require conversion by the animal to long chain fatty acids which is inefficient and poor yielding.

Figure 1:
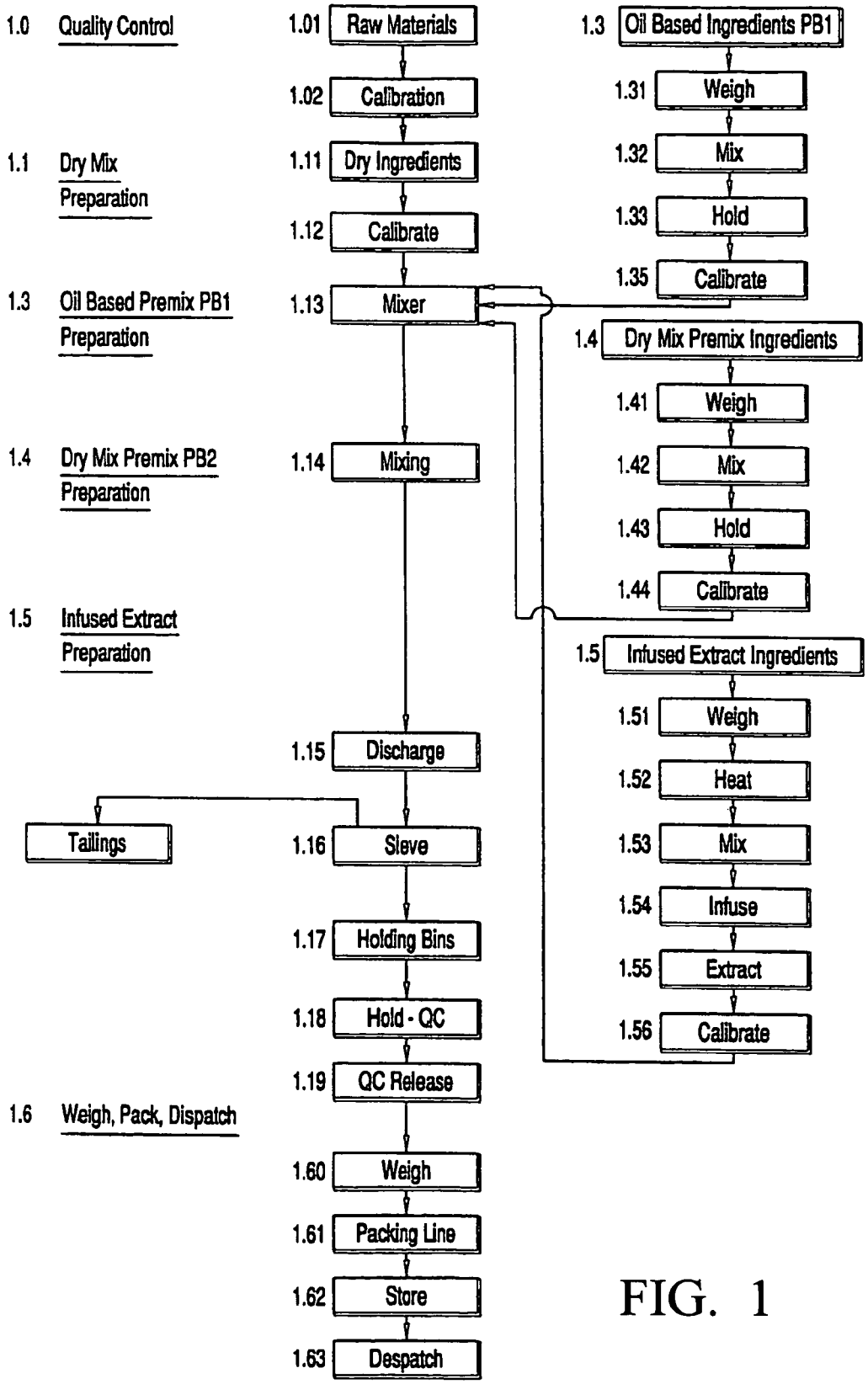
FIG. 1 shows a schematic layout of a typical process for the preparation of a feed supplement according to one embodiment of the invention.

The Annexure shows a variety of supplement formulae according to various embodiments of the invention and adapted for feeding at various stages of development of an animal.

The present invention will now be described according to preferred but non-limiting embodiments and with reference to various examples.

DETAILED DESCRIPTION OF THE INVENTION

The supplement blends according to the examples to be described provide a consistent high source of omega 3 long chain fatty acids, especially DHA in animal diets to thereby increase the intake of omega 3 long chain fatty acids in the human diet. The supplement blends have been found to eliminate taint of the resultant produce and to enhance the flavour of the produce. Conventional wisdom prior to the invention required the implementation of at least a 14 day fishmeal exclusion prior to slaughter to avoid fish taint. This 14 day exclusion period presents practical difficulties on farms where the producer is forced by farm circumstances to operate with a single stage finishing diet. In some cases it could lead to the withdrawal of fishmeal in the diet at a much earlier stage with possible adverse implications for livestock health. There is concern that the 14 day exclusion could be increased for many weeks and possibly up to 12 weeks. Experts currently believe that when feeding fishmeal up to 5% of the dietary intake of the animal there is a comfortable safety margin for eliminating off flavours in the animal produce, provided that as an added safeguard fishmeal is excluded from the diet two months before slaughter.

The present invention challenges convention wisdom and overcomes the problems of prior art fishmeal feed formulae by providing a range of fishmeal feed supplements which may be significantly above the currently recognised upper percentage limits for elimination of taint but which do not result in taint of the produce.

Taint in foodstuffs is normally determined by a Sensory Panel of experts who are trained in determining whether a particular foodstuff has certain taste characteristics. Thus one expert may have a proven sensitivity to sweetness, in cheese and another in meats. Other experts can determine whether animal produce is tainted with a fishy taste after feeding with fish meal. Trials were conducted to determine whether animal produce from animals fed with the feed supplements and associated formulae according to the present invention were tainted Although prior to the invention, experts believed that fishmeal supplements greater than 5% of the total diet of the animal would lead to fishy taint, the Sensory Panel evaluating the Supplements and formulae according to the invention (marketed under the trademark name Porcomega) fed to pigs found that supplements greater than 5% of the total diet of the animal did not result in taint of the produce.

Tests on the effects on animal produce of fish meal supplements according to the invention and greater than 5% of the total diet of the animal were carried out in the Commonwealth Scientific and Industrial Research Organisation Department of Human Food Nutrition in Adelaide, Australia. The panel found that the produce tested did not suffer from fishy taint.

Preferably, the percentage range of fishmeal with fish oil content between 11%-13% in the diet of an animal in which omega 3 fatty acid enrichment is required is 5%-20%. Due to the blends of the supplements used, the fishmeal may be fed up to slaughter in these percentages. FIG. 1 shows a schematic layout of a typical process for the preparation of feed supplements according to the method aspect of the present invention.

According to the method aspect of the invention, quality control is most important for conformity of the finished supplement and its raw materials. As a matter of routine practice, the constituent ingredients should be checked for physical conformity and condition. Preferably, chemical analyses are carried out and with checks for any infestations from insects etc. The ingredients must be free from rancid, musty, stale or any other objectionable odours. Therefore, thorough physical examination is important.

Prior to the start of each production run and after any extended downtime, the process line is evaluated to verify that the line is in satisfactory condition and that all controls are calibrated and functioning. This is described as calibration step 1.02.

Step 1.1 involves the preparation of the dry mix wherein bulk ingredients 1.11 are selected according to the particular formula, followed by calibration step 1.12 involving weighing out bulk ingredients. The ingredients are then transferred for mixing. Step 1.3 is preparation of the oil based premix. Preparation of the oil based premix involves the following steps. The raw materials are selected and weighed 1.31 according to the selected formula. These materials are mixed 1.32 by stirring with preweighed preheated 70 degrees C. oil carrier in a steam jacketed mixing vessel. The mix is then held for quality control step 1.33 followed by calibration step 1.35 wherein the mix is metered into the dry mixer according to formula.

Step 1.4 is the preparation of the Dry Mix Premix. Step 1.41 is the selection and weighing of the ingredients according to formula. In step 1.42 the ingredients are mixed together followed by quality control step 1.43 and calibration step 1.44 wherein the mix is metered into the bulk dry mixer according to formula. The next phase step 1.5 involves the following procedure. Step 1.51 is the selection and weighing of ingredients according to formula. In step 1.51 ingredients are added to preweighed water heated to 100 degrees C. in the steam jacketed reaction vessel followed by mixing step 1.53. In step 1.54 a preweighed Green Tea ingredient retained in a cloth bag is infused into the mix. In step 1.55 the green tea is extracted for 30 minutes and the spent Green Tea is discarded. Step 1.56 involves metered mixing according to formula into the bulk dry mixer. According to steps 1.15 to 1.19 the mixture is mixed for 10 minutes until it is homogenous following which the mixture is discharged and sieved through a 2 mm screen wherein the tailings are discarded. The mixture is then subject to quality control According to steps 1.6 to 1.63 the mixture is released for weighing, checking, packing and despatch.

Trials in human volunteers were undertaken to test the hypothesis that regular consumption of pork enriched with long chain omega 3 fatty acids will lead to increased levels of these fatty acids in the circulation and resultant improvement in cardiovascular health.

The trial objective was to conduct a preliminary dietary intervention study with pork from pigs fed with supplements according to the present invention to determine if there would be any increase in the levels of EPA, DPA or DHA present in the plasma fatty acid pool or in erythrocyte (RBC) membrane phospholipids in human volunteers eating lean cuts of pork over a 4 week period. The tests endeavoured to determine whether the increase in omega 3 fatty acid supplementation would influence the two health parameters that are reportedly most responsive to omega 3 fatty acid supplementation namely reduction of plasma triglycerides and platelet thromboxane production.

Figure 2:
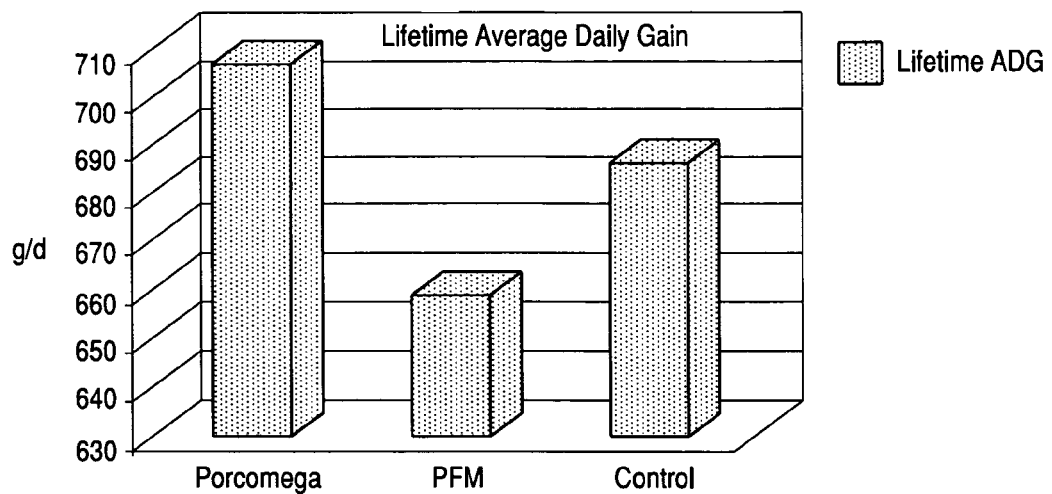
FIG. 2 depicts relative proportions of long chain fatty acids in selected cuts of meat from pigs fed a control diet of the fishmeal supplement according to the invention for 10 weeks.
Figure 3:
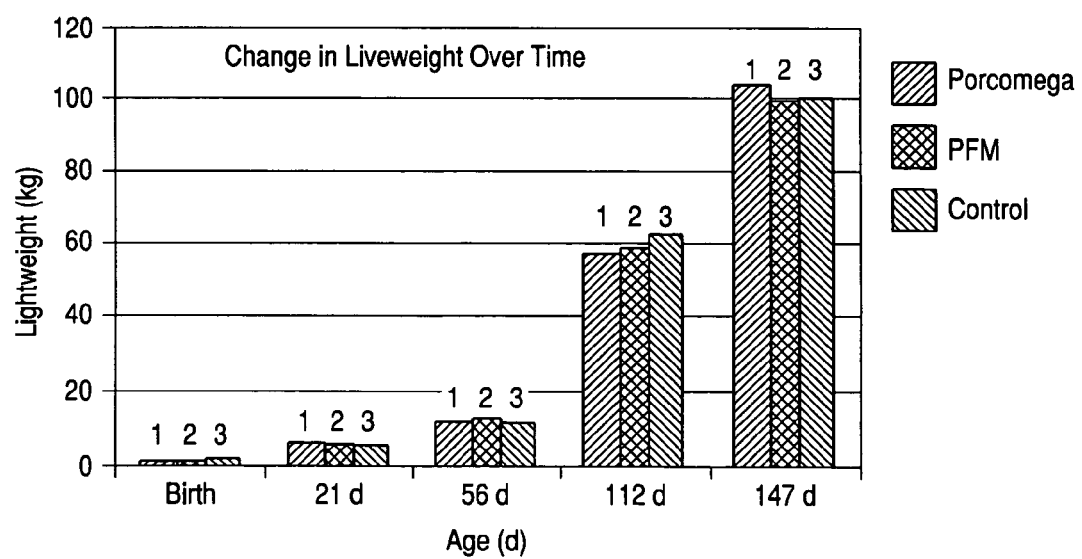
FIG. 3 shows omega 3 concentrations in selected cuts of meat from pigs fed a control diet of the fish meal supplement according to the present invention.

A study was conducted to determine how much omega 3 enrichment could be achieved using fish meal. Nine week old pigs were fed a ration containing 20% of a high grade fishmeal supplement formula according to the present invention. EPA, DPA and DHA accounted for 1.9%, 0.5% and 6.5% respectively of total fatty acids in the diet. There were negligible amounts in a control diet. Groups of three pigs were fed the control diet for 7 or 11 weeks or the fish meal diet for 6 to 10 weeks before slaughter. Growth and feed conversion rates were similar in control and fish meal fed pigs. In the latter, omega 3 consumption averaged 15 g/pig/day which resulted in striking increases in the plasma levels of DHA and particularly EPA. In the week before slaughter the high circulating levels declined but there was significant retention of long chain omega 3 polyunsaturated fatty acids including DPA in lean portions sampled from various cuts of fresh pork which increased with the duration of feeding. FIG. 2 is a graph which depicts relative proportions of long chain fatty acids in selected cuts of meat from pigs fed a control diet of the fishmeal supplement according to the invention for 10 weeks. FIG. 3 is a graph which shows omega 3 concentrations in selected cuts of meat from pigs fed a control diet of the fish meal supplement according to the present invention. The proportion of long chain omega 3 polyunsaturated fatty acids in lean loin chops (4.3% fat) rose from 1.1% in controls to 6% in the fish meal fed pigs representing a yield of 250 mg/100 g of fresh meat. In forequarter chops the proportion was less (4.1%) but the fat content was higher (8.7%). Hence the omega 3 yield was even greater: 360 mg/100 g. Furthermore the surrounding layer of fat contained five times as much long chain omega 3 fatty acids. The study indicates that the omega 3 yield of pork products fed with a supplement according to the invention will depend upon their overall fat content.

Twenty seven volunteers (participants and their partners) completed the sensory evaluation of cooked pork. The results appear in Table 1 below and demonstrate no significant preference for either the n-3 enriched pork or the control pork. Most importantly the volunteers did not detect any preference for one pork over the other indicating that there was no detectable taint in the pork.

TABLE 1

Sensory evaluation of pork.

| | | Prefer Porcomega | Prefer normal pork | No preference |
|---|---|---|---|---|
| Loin | taste | 7 | 12 | 8 |
| | smell | 5 | 2 | 20 |
| | mouthfeel | 11 | 8 | 8 |
| Forequarter | taste | 6 | 10 | 11 |
| | smell | 6 | 6 | 15 |
| | mouthfeel | 7 | 9 | 11 |
| OVERALL | | 7.0 | 7.8 | 12.2 |

Detailed studies have been carried out on the carcasses of pigs fed with the supplement formula according to a regime commensurate with the stage of development of the pig. Results of the analyses of the carcasses vary according to the site. Tables 1-5 below set out examples of the formulae of the food supplements according to various embodiments of the invention. It was found that there were no significant dietary effects of the inclusion of the supplements according to the invention, fishmeal or fish oil on growth rate and slaughter characteristics of the pigs in this study. The meat from all diets were found acceptable to consumers. None of the produce from Diets 1-5 were considered unacceptable. The determination of fatty acid profiles in meat samples was carried out by Professor Len Storlien of the Biological Sciences Department of the University of Wollongong New South Wales The dietary supplements are tailored to suit the stage of development of the pig. Of the Diets identified below, Diet 5 is the least preferred in favour of diets 1-4.

TABLE 2

DIETS 1-5

| | |
|---|---|
| 1 | CONTROL |
| 2 | CONTROL + 3% FISH OIL |
| 3 | 15% SEAPEP |
| 4 | 15% SUPPLEMENT ACCORDING TO THE INVENTION (Porcomega) |

TABLE 2-continued

DIETS 1-5

| | |
|---|---|
| 5 | 15% SUPPLEMENT ACCORDING TO THE INVENTION (Porcomega) + 3% FISH OIL |

The following examples show that the omega 3 long chain fatty acid content of pork is significantly increased in pigs fed supplements in accordance with the present invention. The examples tabulate the fatty acid profile of phospholipid and Triglyceride from specified sites of male and female pigs for each of the diets identified in Table 2.

Example 1

Fatty Acid Profile (DHA, EPA, DPA) of Phospholipid from Three Sites (Loin, Leg, Forquarter) in 5 MALE PIGS

| DIET | DHA | EPA | DPA | Total n − 3 | n6/n3 |
|---|---|---|---|---|---|
| LOIN (as % of Fat) | | | | | |
| 1. Control | 1.7177 | 0.7430 | 1.6755 | 5.035 | 7.044 |
| 2. Control + 3% Fish Oil | 4.5484 | 4.7766 | 1.2947 | 11.679 | 2.807 |
| 3. 15% Seapep | 5.5875 | 2.9664 | 1.6813 | 11.037 | 3.088 |
| 4. 15% Porcomega | 5.875 | 4.2736 | 1.8344 | 12.941 | 2.600 |
| 5. 15% Porcomega + 3% Fish Oil | 9.4645 | 3.0052 | 0.7113 | 13.181 | 2.219 |
| LEG (as % of Fat) | | | | | |
| 1. Control | 1.2720 | 0.5703 | 1.0655 | 4.2150 | 9.933 |
| 2. Control + 3% Fish Oil | 6.6598 | 4.8659 | 1.4591 | 13.309 | 1.943 |
| 3. 15% Seapep | 6.2464 | 1.9129 | 2.0729 | 11.376 | 2.994 |
| 4. 15% Porcomega | 8.5052 | 3.0288 | 1.0103 | 12.544 | 2.165 |
| 5. 15% Porcomega + 3% Fish Oil | 7.5433 | 5.6210 | 0.0000 | 13.164 | 2.204 |
| FOREQUARTER (as % of Fat) | | | | | |
| 1. Control | 1.1029 | 0.6498 | 0.8971 | 3.655 | 10.430 |
| 2. Control + 3% Fish Oil | 6.3329 | 5.6516 | 1.5256 | 14.293 | 2.160 |
| 3. 15% Seapep | 6.7154 | 0.5542 | 1.6361 | 10.189 | 3.234 |
| 4. 15% Porcomega | 7.5528 | 4.6347 | 0.1816 | 13.381 | 2.349 |
| 5. 15% Porcomega + 3% Fish Oil | 8.3222 | 5.0940 | 0.0000 | 13.332 | 1.889 |

Example 2

Fatty Acid Profile (DHA, EPA, DPA) of Phospholipid from Three Sites (Loin, Leg, Forquarter) in 5 FEMALE PIGS
LOIN (as % of Fat)

| DIET | DHA | EPA | DPA | Total n − 3 | n6/n3 |
|---|---|---|---|---|---|
| 1. Control | 2.7958 | 1.5085 | 1.5652 | 6.941 | 5.439 |
| 2. Control + 3% Fish Oil | 6.4429 | 6.2143 | 1.9654 | 15.564 | 1.839 |
| 3. 15% Seapep | 6.1195 | 3.9108 | 1.9291 | 12.545 | 2.626 |
| 4. 15% Porcomega | 6.3399 | 6.9938 | 2.3628 | 16.132 | 2.018 |
| 5. 15% Porcomega + 3% Fish Oil | 7.6822 | 7.3558 | 1.8541 | 17.537 | 1.673 |

Example 3

Fatty Acid Profile (DHA, EPA, DPA) of Triglyceride from Three Sites (Loin, Leg, Forquarter) in 5 FEMALE PIGS
LOIN (as % of Fat)

| DIET | DHA | EPA | DPA | Total n − 3 | n6/n3 |
|---|---|---|---|---|---|
| 1. Control | 0.2110 | 0.0519 | 0.1273 | 0.585 | 20.546 |
| 2. Control + 3% Fish Oil | 0.8181 | 0.2441 | 0.3250 | 1.684 | 1.844 |
| 3. 15% Seapep | 0.6097 | 0.0000 | 0.0000 | 0.610 | 3.061 |
| 4. 15% Porcomega | 0.8410 | 0.3872 | 0.0000 | 1.228 | 3.070 |
| 5. 15% Porcomega + 3% Fish Oil | 0.7160 | 0.2839 | 1.1113 | 2.111 | 0.892 |

Example 4

Fatty Acid Profile (DHA, EPA, DPA) of Triglyceride from Three Sites (Loin, Leg, Forquarter) in 5 MALE PIGS
LOIN (as % of Fat)

| DIET | DHA | EPA | DPA | Total n − 3 | n6/n3 |
|---|---|---|---|---|---|
| 1. Control | 0.3949 | 0.0000 | 0.1557 | 0.740 | 11.041 |
| 2. Control + 3% Fish Oil | 4.2856 | 1.3361 | 0.6500 | 6.673 | 1.801 |
| 3. 15% Seapep | 1.3639 | 0.2781 | 0.1501 | 1.792 | 3.222 |
| 4. 15% Porcomega | 1.5530 | 0.3823 | 0.1366 | 2.072 | 2.720 |
| 5. 15% Porcomega + 3% Fish Oil | 1.7744 | 0.5098 | 0.2049 | 2.608 | 1.509 |

A trial using 25 large white female pigs and the above Diets was commenced on 12 Dec. 1996 with a (mean lightweight 21.5 kg) running through slaughter on 12 Mar. 1997. At slaughter the pigs were weighed and values recorded. Sub samples from each sex and dietary treatment were taken for taste and taint evaluations. There were no signs of significant weight gain. There were no apparent differences in weight gain of the male pigs due to dietary treatment. A similar result occurred with females and there were no significant differences due to type of fishmeal or oil added to the diet.

The following table 3 shows carcass and performance data for female pigs. Combined (male and female) statistical analysis of FIG. 2 and table 2 showed a significant difference (P=0.0001) in dressing percentage between the male and female pigs. The effect of sex approached traditional significance (P=0.06) for ADG. There were no significant effects of diet (type of fishmeal or oil) on any parameter nor any significant interactions of sex and diet.

TABLE 2

| Diet | No | Slaughter LWT | Wt (kg) DWT | DR % | P 2 (mm) | Gain (kg) | ADG (g/d) |
|---|---|---|---|---|---|---|---|
| 1 | 5 | 100.4 | 69.4 | 69.1 | 18.8 | 79.0 | 888 |
| 2 | 5 | 103.8 | 70.7 | 68.1 | 18.2 | 81:9 | 920 |
| 3 | 5 | 102.1 | 70.7 | 69.3 | 15.2 | 81.2 | 912 |
| 4 | 5 | 100.1 | 69.3 | 69.2 | 18.6 | 79.3 | 891 |
| 5 | 5 | 103.7 | 73.0 | 70.4 | 17.4 | 81.3 | 914 |

Average daily gain calculated over an 89 day period.

Meat from each diet were evaluated for taste and taint. Meat was cooked in boiling water for 60 minutes. Small pieces of 1 m3 from each treatment were evaluated for pork taste (with reference to a scale of 0-10 in which 10 is extremely tasty and for taint on a scale of 1-10 in which 10 is extremely tainted). The results of the tests are set out in table 3 below.

TABLE 3

The effect of diet on the taste and taint of male and female pig meat.

| Diet | Subjects | Taste (0-10) | SE* | Taint (0-10) | SE |
|---|---|---|---|---|---|
| 1 | 10 | 6.65 | 0.49 | 1.15 | 0.63 |
| 2 | 10 | 5.80 | 0.49 | 1.95 | 0.63 |
| 3 | 10 | 5.75 | 0.49 | 2.45 | 0.63 |
| 4 | 10 | 5.10 | 0.49 | 3.30 | 0.63 |
| 5 | 10 | 4.20 | 0.51 | 4.35 | 0.64 |

*Standard error of the mean.

There were no significant effects of sex (of pig) on either taste or taint in this test. The results indicate no deleterious effects on either growth rate, carcass yield or carcass characteristics. Analysis indicates that the feed supplements according to the invention enhance the omega 3 long chain fatty acids content of the meat. The feed supplements may be used with or without withdrawal periods prior to slaughter.

Clinical trials show a beneficial thromboxane result having the desired consequential physiological effects.

Figure 4:
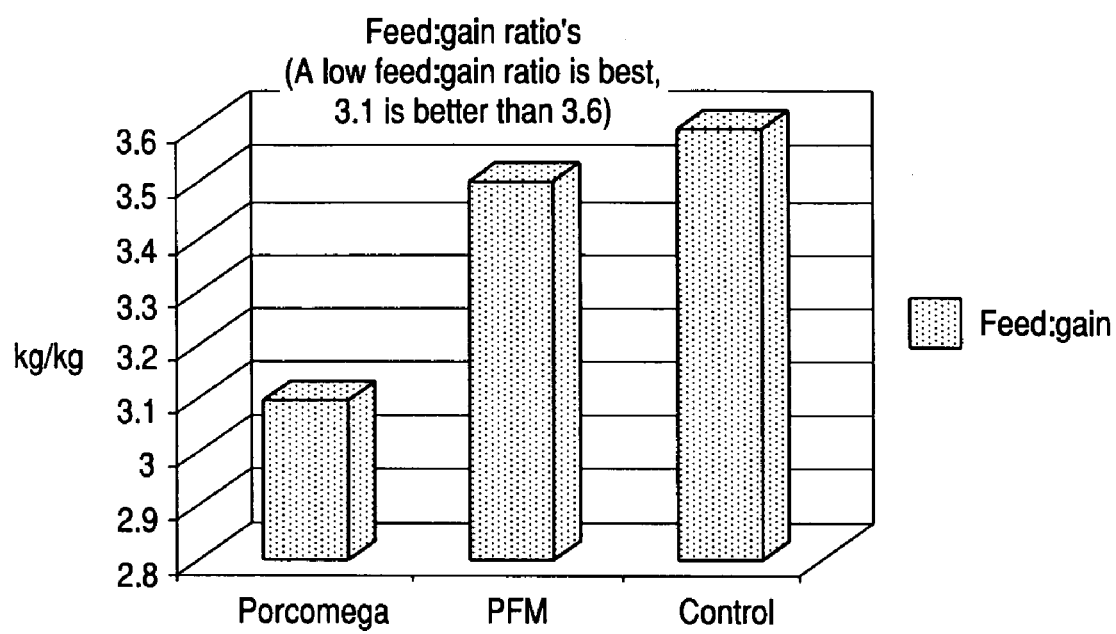
FIG. 4 shows feed gain ratios for grower pigs fed supplement according to the invention, PFM pigs, and control pigs (3.6).

A good measure of ration efficiency is the amount of feed required by a growing animal for it to gain a unit of weight. Feed represents 60%-70% of the running costs of a piggery. It has been estimated that a 0.1 unit change in feed efficiency is worth about AU$40/sow/year in terms of feed. During the lactation phase, PFM fed sows consumed approximately 84 kg of feed each for a net gain of 10 kg. Based on this their feed gain ratio was 8:4:1. Over the same period the feed gain ratio for the pigs fed with the supplement according to the invention was 3:7:1 (74 kg feed for 20 kg gain). FIG. 4 is a graph which shows feed gain ratios and it can be seen that gain for grower pigs was best for those fed supplement according to the invention (3.1) followed by PFM pigs (3.5) and control pigs (3.6).

A taste panel found that there was a preference for pigs fed with the supplement as the PFM pigs suffered from fishy taint which was detected by all members of the taste panel.

Annexure 1 sets out a range of supplement formulae according to embodiments of the invention which relate to the stage of growth of an animal which is fed the supplement.

It will be recognised by those skilled in the art that the compositions and supplement formula disclosed are examples only and that these or variations thereof may be fed to other animals such as but not limited to beef, cattle, sheep and poultry to achieve the objects of the invention and as such are therefore within the spirit and scope of the invention broadly described herein. For example, the consistency of the premixes before addition may be varied. The flavour of the system may be altered for instance using Fenugreek.

ANNEXURE

1. FORMULA PER TONNE PORCOMEGA*
PIGLET STARTER EW 001 #

|  | kg | % |
|---|---|---|
| PORCOMEGA* BASE-SP | 970.80 | 97.080 |
| VITAMIN PREMIX LW 001 | 2.50 | 0.250 |
| MINERAL PREMIX PM 001 | 10.00 | 1.000 |
| AMINO ACID PREMIX PAA 001 | 10.00 | 1.000 |
| CHOLINE CHLORIDE 60% | 6.70 | 0.670 |
|  | 1000.00 | 100.000 |

USAGE: 150 KG PER TONNE OF PIGLET STARTER EW DIET.

1. PIG STARTER EW VITAMIN PREMIX PV 001

| COMPOSITION INGREDIENT | POTENCY/ GM | FORMULA | ACTIVE/ Kg PREMIX |
|---|---|---|---|
| VITAMIN A-500 | 500.000 IU | 53.60 gm | 26,800,000 IU |
| VITAMIN D3-500 | 500,000 IU | 13.40 gm | 6,700,000 IU |
| VITAMIN E-50% | 500 IU | 52.80 gm | 26,400 IU |
| VITAMIN K3 | 1000 mg | 4.02 gm | 4.02 gm |
| THIAMINE HYDROCHLORIDE USP | 892 mg | 4.51 gm | 4.02 gm |
| RIBOFLAVIN 95% F.G. | 950 mg | 11.28 gm | 10.72 gm |
| PYRIDOXINE USP | 823 mg | 6.51 gm | 5.36 gm |
| VITAMIN B12-SUPPLEMENT 1% | 10 mg | 5.36 gm | 53.60 gm |
| NIACIN USP | 990 mg | 54.14 gm | 53.60 gm |
| CALCIUM d-PANTOTIHENATE USP | 920 mg | 34.96 gm | 32.16 gm |
| FOLIC ACID USP | 920 mg | 4.37 gm | 4.02 gm |
| D-BIOTIN SUPPLEMENT 1% | 10 mg | 21.44 gm | 214.40 mg |
| GREEN TEA POWDER - Antioxidant | 1000 mg | 120.00 gm | 120.00 gm |
| VANILLIC CRYSTALS | 1000 mg | 53.60 gm | 53.60 gm |
| WHEAT MEAL CARRIER |  | 560.01 gm |  |
|  |  | 1000.00 gm |  |

USAGE: 2.5 Kg per Tonne Porcomega* Pig Starter EW Supplement 001.

PIG STARTER EW- PORCOMEGA* AND COMPLETE FEED VITAMIN ADDITION

| COMPOSITION INGREDIENT | ACTIVE/ Tonne PORCOMEGA* | ACTIVE/ Kg COMPLETE FEED |
|---|---|---|
| VITAMIN A-500 | 67.000,000 IU | 10,000 IU |
| VITAMIN D3-500 | 16,750,000 IU | 2.500 IU |
| VITAMIN E-50% | 466.000 IU | 69.500 IU |
| VITAMIN K3 | 10.05 gm | 1.50 mg |
| THIAMINE HYDROCHLORIDE USP | 10.05 gm | 1.50 mg |
| RIBOFLAVIN 95% F.G. | 26.80 gm | 4.00 mg |
| PYRIDOXINE USP | 13.40 gm | 2.00 mg |
| VITAMIN B12-SUPPLEMENT 1% | 134.00 mg | 20.00 mg |
| NIACIN USP | 134.00 gm | 20.00 mg |
| CALCIUM d-PANTOTIHENATE USP | 80.40 gm | 12.00 mcg |
| FOLIC ACID USP | 10.05 gm | 1.50 mg |
| D-BIOTIN SUPPLEMENT 1% | 536.00 mg | 80.00 mcg |
| CHOLINE CHLORIDE | 4020.00 gm | 600.00 mg |
| GREEN TEA POWDER | 300.00 gm | 44.77 mg |
| VANILLIC CRYSTALS | 134.00 gm | 20.00 mg |

PIG STARTER EW MINERAL PREMIX PM 001

| COMPOSITION INGREDIENT | POTENCY/ GM | FORMULA | ACTIVE/ Kg PREMIX |
|---|---|---|---|
| FERROUS SULPHATE [FeS04.H20] | 310.0 mg | 216.125 gm | 67.000 gm |
| ZINC SULPHATE | 360.0 mg | 186.110 gm | 67.000 gm |
| MANGANESE SULPHATE [MnS04.H20] | 280.0 mg | 95.715 gm | 26.800 gm |
| POTASSIUM IODIDE (STAB) | 68.8 mg | 0.488 gm | 0.335 gm |
| COBALT CARBONATE | 460.0 mg | 0.728 mg | 0.335 gm |
| COPPER SULPHATE | 250.0 mg | 335.000 gm | 83.750 gm |
| SODIUM SELENITE | 400.0 mg | 0.504 gm | 0.201 gm |
| LIMESTONE CARRIER | 1000.0 mg | 165.330 gm | 165.330 gm |
| | | 1000.000 gm | |

USAGE: 10 Kg per Tonne Porcomega* Pig Starter EW Supplement 001.

PIG STARTER EW PORCOMEGA* AND COMPLETE FEED MINERAL ADDITION

| COMPOSITION INGREDIENT | ACTIVE/ Tonne PORCOMEGA* | ACTIVE/ Kg COMPLETE FEED |
|---|---|---|
| FERRQUS SULPHATE-Fe [FeS04.H20] | 670.00 gm | 100.500 mg |
| ZINC SULPHATE-Zn | 670.00 gm | 100.500 |
| MANGANESE SULPHATE-Mn [MnS04.H20] | 268.00 gm | 40.200 mg |
| POTASSIUM IODIDE (STAB)-I | 3.35 gm | 0.502 mg |
| COBALT CARBONATE | 3.35 gm | 0.502 mg |
| COPPER SULPHATE-Cu | 837.50 gm | 125.625 mg |
| SODIUM SELENITE-Se | 2.01 gm | 0.301 mg |

PIGLET STARTER EW AMINO ACID PREMIX PAA OOI

| COMPOSITION INGREDIENT | FORMULA | /Kg PREMIX |
|---|---|---|
| 1-LYSINE | 6700.00 gm | 670.00 gm |
| dl-METHIONINE | 1340.00 gm | 134.00 gm |
| THREONINE | 1340.00 gm | 134.00 gm |
| WHEAT MEAL CARRIER | 620.00 gm | |
| | 10000.00 gm | |

USAGE: 10 KG PER TONNE OF PORCOMEGA* PIGLET STARTER EW 001.

| AMINO ACID ADDITIONS | /Tonne PORCOMEGA* | /Kg COMPLETE FEED |
|---|---|---|
| 1-LYSINE | 6700.00 gm | 1000.00 mg |
| dl-METHIONINE | 1340.00 gm | 200.00 mg |
| THREONINE | 1340.00 gm | 200.00 mg |

PORCOMEGA* PIGLET STARTER EW SUPPLEMENT 001 THEORETICAL ANALYSES TBA

| | |
|---|---|
| D.E. KJ/Kg | CALCIUM % |
| CRUDE FIBRE % | PHOSPHORUS (Total) % |
| CRUDE PROTEIN % | |
| CRUDE FAT % | |
| LYSINE (Total) % | |
| LYSINE (Avail) % | |
| METHIONINE % | |
| METH. + CYSTINE % | |
| ARGMINE % | |
| GLYCINE % | |
| ISOLEUCINE % | |
| LEUCINE % | |
| THREONINE % | |
| TRYPTOPHAN % | |
| HISTIDINE % | |
| PHENYLALANINE % | |
| PHENYL. + TYROSINE % | |
| SERINE % | |
| VALINE % | |
| FATTY ACIDS | |
| LINOLEIC ACID % | |
| LINOLENIC ACID % | |
| w-3 | |
| — | |
| EPA % | |
| DHA % | |

2. FORMULA PER TONNE PORCOMEGA* PIG WEANER 002

| | Kg | % |
|---|---|---|
| PORCOMEGA* BASE SP | 970.80 | 97.080 |
| VITAMIN PREMIX PV 002 | 2.50 | 0.250 |
| MINERAL PREMIX PM 002 | 10.00 | 1.000 |
| AMINO ACID PREMIX PAA 002 | 10.00 | 1.000 |
| CHOLINE CHLORIDE 60% | 6.70 | 0.670 |
| | 1000.00 | 100.000 |

USAGE: 150 KG PER TONNE OF PIG WEANER DIET 002.

2. PIG WEANER VITAMIN PREMIX PV 002.

| COMPOSITION INGREDIENT | POTENCY/GM | FORMULA | ACTIVE/Kg PREMIX |
|---|---|---|---|
| VITAMIN A-500 | 500.000 IU | 53.60 gm | 26.800,000 IU |
| VITAMIN 3-500 | 500,000 IU | 13.40 gm | 6.700,000 IU |
| VITAMIN E-50% | 500 IU | 52.80 gm | 26,400 IU |
| VITAMIN K3 | 1000 mg | 4.02 gm | 4.02 gm |
| THIAMINE HYDROCHLORIDE USP | 892 mg | 3.00 gm | 2.68 gm |
| RIBOFLAVIN 95% F.G. | 950 mg | 9.87 gm | 9.38 gm |
| PYRIDOXINE IJSP | 823 mg | 4.88 gm | 4.02 gm |
| VITAMIN B12-SUPPLEMENT 1% | 10 mg | 4.69 gm | 46.90 mg |
| NIACIN USP | 990 mg | 40.61 gm | 40.20 gm |
| CALCIUM d-PANTOTFIENATE USP | 920 mg | 34.96 gm | 32.16 gm |
| FOLIC ACID USP | 920 mg | 4.37 gm | 4.02 gm |
| D-BIOTIN SUPPLEMENT 1% | 10 mg | 13.40 gm | 134.00 mg |
| GREEN TEA POWDER | | 120.00 gm | 120.00 gm |
| VANILLIC CRYSTALS | 1000 mg | 53.60 gm | 53.60 gm |
| WIIEAT MEAL CARRIER | | 580.07 gm | |
| | | 1000.00 gm | |

USAGE: 2.5 Kg per Tonne Porcomega* Pig Weaner Supplement 002.

PIG WEANER- PORCOMEGA AND COMPLETE FEED VITAMIN ADDITION

| COMPOSITION INGREDIENT | ACTIVE/Tonne PORCOMEGA* | ACTIVE/Kg COMPLETE FEED |
|---|---|---|
| VITAMIN A-500 | 67,000,000 IU | 10,000 IU |
| VITAMIN D3-500 | 16,750,000 IU | 2.500 IU |
| VITAMIN E-50% | 466.000 IU | 69.5 IU |
| VITAMIN K3 | 10.05 gm | 1.50 mg |
| THIAMINE HYDROCHLORIDE USP | 6.70 gm | 1.00 mg |
| RIBOFLAVIN 95% F.G. | 23.45 gm | 3.50 mg |
| PYRIDOXINE USP | 10.05 gm | 1.50 mg |
| VITAMIN B12-SUPPLEMENT 1% | 117.25 mg | 17.50 mg |
| NIACIN USP | 100.50 gm | 15.00 mg |
| CALCIUM d-PANTOTHENATE USP | 67.00 gm | 10.00 mg |
| FOLIC ACID USP | 10.05 gm | 1.50 mg |
| D-BIOTIN SUPPLEMENT 1% | 335.00 mg | 50.00 mg |
| CHOL1NE CHLORIDE | 3350.00 gm | 500.00 mg |
| GREEN TEA POWDER | 300.00 gm | 44.77 mg |
| VANILLIC CRYSTALS | 134.00 gm | 20.00 mg |

PIG WEANER MINERAL PREMIX PM 002

| COMPOSITION INGREDIENT | POTENCY/GM | FORMULA | ACTIVE/Kg PREMIX |
|---|---|---|---|
| FERROUS SULPHATE [FeS04.H20] | 3100 mg | 216.125 gm | 67.000 gm |
| ZINC SULPHATE-Zn | 360.0 mg | 186.110 gm | 67.000 gm |
| MANGANESE SULPHATE [MnS04.H20] | 280.0 mg | 95.715 gm | 26.800 gm |
| POTASSIUM IODIDE (STAB)-I | 68.8 mg | 0.488 gm | 0.335 gm |
| COBALT CARBONATE | 460.0 mg | 0.728 gm | 0.335 gm |
| COPPER SULPHATE | 250.0 mg | 335.000 gm | 83.750 gm |
| SODIUM SELENITE | 400.0 mg | 0.504 gm | 0.201 gm |
| LIMESTONE CARRIER | 1000.0 mg | 165.330 gm | 165.330 gm |
| | | 1000.000 gm | |

USAGE: 10 Kg per Tonne Porcomega* Pig Weaner Supplement 002.

PIG WEANER PORCOMEGA* AND COMPLETE FEED MINERAL ADDITION

| COMPOSITION INGREDIENT | ACTIVE/Tonne PORCOMEGA | ACTIVE/Kg COMPLETE FEED |
|---|---|---|
| FERROUS SULPHATE-Fe [FeS04.H20] | 670.00 gm | 100.500 mg |
| ZINC SULPHATE-Zn | 670.00 gm | 100.500 mg |
| MANGANESE SULPHATE-Mn [MnS04.H20] | 268.00 gm | 40.200 mg |
| POTASSIUM IODIDE (STAB)-I | 3.35 gm | 0.502 mg |
| COBALT CARBONATE-Co | 3.35 gm | 0.502 mg |
| COPPER SULPHATE-Cu | 837.50 gm | 125.625 mg |
| SODIUM SELENITE-Se | 2.01 gm | 0.301 mg |

PIGLET WEANER AMINO ACID PREMIX PAA 002

| COMPOSITION INGREDIENT | FORMULA | /Kg PREMIX |
|---|---|---|
| I-LYSINE | 6700.00 gm | 670.00 gm |
| dI-METHONINE | 1340.00 gm | 134.00 gm |
| THREONINE | 1340.00 gm | 134.00 gm |
| WHEAT MEAL CARRIER | 620.00 gm | 10000.00 gm |

USAGE: 10 KG PER TONNE OF PORCOMEGA* PIG WEANER SUPPLEMENT.

PIG WEANER AMINO ACID PREMIX PAA 002

| AMINO ACID ADDITIONS | /Tonne PORCOMEGA* | /Kg COMPLETE FEED |
|---|---|---|
| I-LYSINE | 6700.00 gm | 1000.00 mg |
| d1-METHONINE | 1340.00 gm | 200.00 mg |
| THREONINE | 1340.00 gm | 200.00 mg |

| PORCOMEGA. PIGLET WEANER SUPPLEMENT 002. THEORETICAL ANALYSES TBA | |
|---|---|
| D.E. KJ/Kg | CALCIUM % |
| CRUDE FIBRE % | PHOSPHORUS (Total) % |
| CRUDE PROTEIN % | |
| CRUDE FAT % | |
| LYSINE (Total) % | |
| LYSINE (Avail) % | |
| METHIONINE % | |
| METH. + CYSTINE % | |
| ARGMINE % | |
| OLYCINE % | |
| ISOLEUCINE % | |
| LEUCINE % | |
| THREONINE % | |
| TRYPTOPHAN % | |
| HISTIDINE % | |
| PHENYLALANINE % | |
| PHENYL. + TYROSINE % | |
| SERINE % | |
| VALINE % | |
| FATTY ACIDS | |
| LINOLEIC ACID % | |
| LINOLENIC ACID % | |
| w-3 | |
| — | |
| EPA % | |
| DHA % | |

3. FORMULA PER TONNE PORCOMEGAS PIG BREEDER 003

| | kg | % |
|---|---|---|
| PORCOMEGA* BASE SP | 987.50 | 98.750 |
| VITAMIN PREMIX PV 003 | 2.50 | 0.250 |
| MINERAL PREMIX PM 003 | 10.00 | 1.000 |
| | 1000.00 | 100.000 |

USAGE: 150 KG PER TONNE OF PIG BREEDER DIET 003.

3. PIG BREEDER VITAMIN PREMIX PV 003

| COMPOSITION INGREDIENT | POTENCY/GM | FORMULA | ACTIVE/ Kg PREMIX |
|---|---|---|---|
| VITAMIN A-500 | 500,000 IU | 53.60 gm | 26,800,000 IU |
| VITAMIN K3-500 | 500,000 IU | 5.36 gm | 2.680,000 IU |
| VITAMIN E-50% | 500 IU | 134.00 gm | 67,000 IU |
| VITAMIN K3 | 1000 mg | 10.05 gm | 10.05 gm |
| THIAMINE HYDROCHLORIDE USP | 892 mg | 4.51 gm | 4.02 gm |
| RIBOFLAVIN 95% E.G. | 950 mg | 14.11 gm | 13.40 gm |
| PYRIDOXINE USP | 823 mg | 4.88 gm | 4.02 gm |
| VITAMIN B 12-SUPPLEMENT 1% | 10 mg | 4.02 gm | 40.20 mg |
| NIACIN USP | 990 mg | 54.14 gm | 53.60 gm |
| CALCIUM d-PANTOTHENATE USP | 920 mg | 29.13 gm | 26.80 gm |
| FOLIC ACID USP | 920 mg | 2.91 gm | 2.68 gm |
| D-BIOTIN SUPPLEMENT 1% | 10 mg | 53.60 gm | 536.00 mg |
| GREEN TEA POWDER | | 120.00 gm | 120.00 gm |
| VANILLIC CRYSTALS | 1000 mg | 13.40 gm | 13.40 gm WHEAT |
| MEAL CARRIER | | 496.29 gm | |
| | | 1000.00 gm | |

USAGE: 2.5 Kg per Tonne Porcomega* Pig Breeder Supplement.

| PIG BREEDER- PORCOMEGA* AND COMPLETE FEED VITAMIN ADDITION | | |
|---|---|---|
| COMPOSITION INGREDIENT | ACTIVE/ Tonne PORCOMEGA* | ACTIVE/ Kg COMPLETE FEED |
| VITAMIN A-500 | 67,000,000 IU | 10,000 IU |
| VITAMIN D3-500 | 6.700,000 IU | 1,000 IU |
| VITAMIN E-50% | 167,500 IU | 25.0 IU |
| VITAMIN K3 | 10.05 gm | 1.50 mg |
| THIAMINE HYDROCHLORIDE USP | 10.05 gm | 1.50 mg |
| RIBOFLAVIN 95% E.G. | 3350 gm | 5.00 mg |
| PYRIDOXINE USP | 10.05 gm | 1.50 mg |
| VITAMIN B12-SUPPLEMENT 1% | 75.00 mg | 15.00 mg |
| NIACIN USP | 134.00 gm | 20.00 mg |
| CALCIUM d-PANTOTHENATE USP | 67.00 gm | 10.00 mg |
| FOLIC ACID USP | 6.70 gm | 1.00 mg |
| D-BIOTIN SUPPLEMENT 1% | 134.00 mg | 200.00 mg |
| CHOLINE CHLORIDE | 2010.00 gm | 300.00 mg |
| GREEN TEA POWDER | 300.00 gm | 44.77 mg |
| VANILLIC CRYSTALS | 33.50 gm | 5.00 mg |

| PIG BREEDER MINERAL PREMIX PM 003 | | | |
|---|---|---|---|
| COMPOSITION INGREDIENT | POTENCY/GM | FORMULA | ACTIVE/ Kg PREMIX |
| FERROUS SULPHATE [FeS04.H20] | 310.0 mg | 216.125 gm | 67.000 gm |
| ZINC SULPHATE | 360.0 mg | 186.110 gm | 67.000 gm |
| MANGANESE SULPHATE [MnS04.H20] | 280.0 mg | 95.715 gm | 26.800 gm |
| POTASSIUM IODIDE (STAB) | 68.8 mg | 0.488 gm | 0.335 gm |
| COBALT CARBONATE | 460.0 mg | 0.728 gm | 0.335 gm |
| COPPER SULPHATE | 250.0 mg | 13.400 gm | 3.350 gm |
| SODIUM SELENITE | 400.0 mg | 0.251 gm | 0.101 gm |
| LIMESTONE CARRIER | 1000.0 mg | 487.183 gm | |
| | | 1000.000 gm | |

USAGE: 10 Kg per Tonne Porcomega* Pig Breeder Supplement 003.

| PIG BREEDER PORCOMEGA* AND COMPLETE FEED MINERAL ADDITION | | |
|---|---|---|
| COMPOSITION INGREDIENT | ACTIVE/ Tonne PORCOMEGA* | ACTIVE/Kg COMPLETE FEED |
| FERROUS SULPHATE-Fe [FeS04.H20] | 670.00 gm | 100.500 mg |
| ZINC SULPHATE-Zn | 670.00 gm | 100.500 mg |
| MANGANESE SULPHATE-Mn [MnS04.H20] | 268.00 gm | 40.200 mg |
| POTASSIUM IODIDE(STAB)-I | 3.35 gm | 0.502 mg |
| COBALT CARBONATE-Co | 3.35 gm | 0.502 mg |
| COPPER SULPHATE-Cu | 33.50 gm | 5.000 mg |
| L SODIUM SELENITE-Se | 1.01 gm | 0.150 mg |

USAGE: 10 Kg per Tonne Porcomega* Pig Breeder Supplement.

| PORCOMEGA PIG BREEDER SUPPLEMENT 003 | |
|---|---|
| THEORETICAL ANALYSES TBA | |
| D.E. KJ/Kg | CALCIUM % |
| CRUDE FIBRE | PHOSPHOROUS(Total) % |
| CRUDE PROTEIN % | |
| CRUDE FAT % | |
| LYSINE (Total) % | |
| LYSINE (Avail) % | |
| METHIONINE % | |
| METH. + CYSTINE % | |
| ARGMINE % | |
| GLYCINE % | |
| ISOLEUCIME % | |
| LEUCINE % | |

| PORCOMEGA PIG BREEDER SUPPLEMENT 003 |
|---|
| THEORETICAL ANALYSES TBA |
| THREONINE % |
| TRYPTOPHAN % |
| HISTIDINE % |
| PHENYLALANINE % |
| PHENYL + TYROSINE % |
| SERINE % |
| VALINE % |
| FATTY ACIDS |
| LINOLEIC ACID % |
| LINOLENIC ACID % |
| w-3 |
| EPA % |
| DHA % |

| 4. FORMULA PER TONNE PORCOMEGA. PIG BREEDER LACTATING 004 # | | |
| --- | --- | --- |
| | kg | % |
| PORCOMEGA* BASE SP | 984.15 | 98.415 |
| VITAMIN PREMIX PV 004 | 2.50 | 0.250 |
| MINERAL PREMIX PM 004 | 10.00 | 1.000 |
| CHOLINE CHLORIDE 60% | 3.35 | 0.335 |
| | 1000.00 | 100.000 |

USAGE: 150 KG PER TONNE OF PIG BREEDER LACTATING DIET 004.

| PIG BREEDER LACTATING VITAMIN PREMIX PV 004 | | | |
| --- | --- | --- | --- |
| COMPOSITION INGREDIENT | POTENCY/GM | FORMULA | ACTIVE/ Kg PREMIX |
| VITAMIN A-500 | 500,000 IU | 53.60 gm | 26.800,000 IU |
| VITAMIN 03-500 | 500,000 IU | 5.36 gm | 2,680,000 IU |
| VITAMIN E-50% | 500 IU | 134.00 gm | 67,000 IU |
| VITAMIN K3 | 1000 mg | 10.05 gm | 10.05 gm |
| THIAMINE HYDROCHLORIDE USP | 892 mg | 4.51 gm | 4.02 gm |
| RIBOFLAVIN 95% F.G. | 950 mg | 14.11 gm | 13.40 gm |
| PYRIDOXINE USP | 823 mg | 4.88 gm | 4.02 gm |
| VITAMIN B 2-SUPPLEMENT 1% | 10 mg | 4.02 gm | 40.20 mg |
| NIACIN USP | 990 mg | 54.14 gm | 53.60 gm |
| CALCIUM d-PANTOTHENATE USP | 920 mg | 29.13 gm | 26.80 gm |
| FOLIC ACID USP | 920 mg | 2.91 gm | 2.68 gm |
| D-BIOTIN SUPPLEMENT 1% | 10 mg | 53.60 gm | 536.00 mg |
| GREEN TEA POWDER | | 120.00 gm | 120.00 gm |
| VANILLIC CRYSTALS | 1000 mg | 13.40 gm | 13.40 gm |
| WHEAT MEAL CARRIER | | 496.29 gm | |
| | | 1000.00 gm | |

USAGE: 2.5 Kg per Tonne Porcomega* Pig Breeder Lactating Supplement.

| PIG BREEDER LACTATING- PORCOMEGA AND COMPLETE FEED VITAMIN ADDITION | | |
| --- | --- | --- |
| COMPOSITION INGREDIENT | ACTIVE/ Tonne PORCOMEGA* | ACTIVE/ Kg COMPLETE FEED |
| VITAMIN A-500 | 67.000,000 IU | 10.000 IU |
| VITAMIN D3-500 | 6,700,000 IU | 1.000 IU |
| VITAMIN E-50% | 167,500 IU | 25.0 IU |
| VITAMIN K3 | 10.05 gm | 1.50 mg |
| THIAMINE HYDROCHLORIDE USP | 10.05 gm | 1.50 mg |
| RIBOFLAVIN 95% F.G. | 33.50 gm | 5.00 mg |
| PYRIDOXINE USP | 10.05 gm | 1.50 mg |
| VITAMIN B12.SUPPLEMENT 1% | 75.00 mg | 15.00 mg |
| NIACIN USP | 134.00 gm | 0.00 mg |
| CALCIUM (1-PANTOTHENATE USP | 67.00 gm | 10.00 mg |
| FOLIC ACID USP | 6.70 gm | 1.00 mg |
| D-BIOTIN SUPPLEMENT 1% | 134.00 mg | 200.00 mg |
| GREEN TEA POWDER | 300.00 gm | 44.77 mg |
| VANILLIC CRYSTALS | 33.50 gm | 5.00 mg |

| PIG BREEDER LACTATING MINERAL PREMIX PM 004. | | | |
|---|---|---|---|
| COMPOSITION INGREDIENT | POTENCY/GM | FORMULA | ACTIVE/ KgPREMIX |
| FERROUS SULPHATE (FeS04.H20) | 310M mg | 216.125 gm | 67.000 gm |
| ZINC SULPHATE | 360.0 mg | 186.110 gm | 67.000 gm |
| MANGANESE SULPHATE (MnS04.H20) | 280.0 mg | 957 15 gm | 26.800 gm |
| POTASSIUM IODIDE(STAB) | 68.8 mg | 0.488 gm | 0.335 gm |
| COBALT CARBONATE | 460.0 mg | 0.728 gm | 0.335 gm |
| COPPER SULPHATE | 250.0 mg | 13.400 gm | 3.350 gm |
| SODIUM SELENITE | 400.0 mg | 0.25 1 gm | 0101 gm |
| LIMESTONE CARRIER | 1000.0 mg | 487.183 gm | |
| | | 1000.000 gm | |

USAGE: 10 Kg per Tonne Porcomega* Pig Breeder Lactating Supplement.

| PIG BREEDER LACTATING PORCOMEGA. AND COMPLETE FEED MINERAL | | |
|---|---|---|
| ADDITION COMPOSITION INGREDIENT | ACTIVE/ Tonne P0RC0MEGA* | ACTIVE/ Kg COMPLETE FEED |
| FERROUS SULPHATE-Fe (FeS04.H20) | 670.00 gm | 100.500 mg |
| ZINC SULPHATE-Zn | 670.00 gm | 100.500 mg |
| MANGANESE SULPHATE-MU (MnS04.H20) | 268.00 gm | 40.200 mg |
| POTASSIUM IODIDE(STAB)-1 | 3.35 gm | 0.502 mg |
| COBALT CARBONATE-Co | 3.35 gm | 0.502 mg |
| COPPER SULPHATE-Cu | 33.50 gm | 5.000 mg |
| SODIUM SELENITE.Se | 1.01 gm | 0.150 mg |

USAGE:- 10 Kg per Tonne Porcomega Pig Breeder Lactating Supplement.

| PORCOMEGA PIG BREEDER LACTATING SUPPLEMENT 004 THEORETICAL ANALYSES TBA | |
|---|---|
| D.E. KJ/Kg | CALCIUM % |
| CRUDE FIBRE % | PHOSPHORUS (Total) % |
| CRUDE PROTEIN % | |
| CRUDE FAT % | |
| LYSINE (Total) % | |
| LYSINE (Avail) % | |
| METHIONINE % | |
| METH. + CYSTINE % | |
| ARGMINE % | |
| GLYCINE % | |
| ISOLEUCINE % | |
| LEUCINE % | |
| THREONINE % | |
| TRYPTOPHAN % | |
| HISTIDINE % | |
| PHENYLALANINE % | |
| PHENYL. + TYROSINE % | |
| SERINE % | |
| VALINE % | |
| FATTY ACIDS | |
| LINOLEIC ACID % | |
| LINOLENIC ACID % | |
| w-3 | |
| EPA % | |
| DFIA % | |

| 5. FORMULA PER TONNE PORCOMEGA* PIG GROWER 005 # | | |
|---|---|---|
| | kg | % |
| PORCOMEGA BASE SP | 987.50 | 97.080 |
| VITAMIN PREMIX PV 005 | 2.50 | 0.250 |
| MINERAL PREMIX PM 005 | 10.00 | 1.000 |
| | 1000.00 | 100.000 |

USAGE:- 150 KG PER TONNE OF PIG GROWER DIET 005.

| PIG GROWER VITAMIN PREMIX PV 005 | | | |
|---|---|---|---|
| COMPOSITION INGREDIENT | POTENCY/ GM | FORMULA | ACTIVE/ Kg PREMIX |
| VITAMIN A-500 | 500.000 IU | 40.20 gm | 20.100.000 IU |
| VITAMIN D3-500 | 500.000 IU | 8.04 gm | 4.020.000 IU |
| VITAMIN E-50% | 500 IU | 53.60 gm | 26.800 IU |
| VITAMIN K3 | 1000 mg | 2.68 gm | 2.68 gm |
| THIAMINE IIYDROCFILORIDE USP | 892 mg | 3.00 gm | 2.68 gm |
| RIBOFLAVIN 95% F.G. | 950 mg | 7.05 gm | 6.70 gm |
| PYRIDOXINE USP | 823 mg | 4.88 gm | 2.68 gm |
| VITAMIN B12 Supplement 1% | 10 mg | 2.68 gm | 26.80 gm |
| NIACIN USP | 990 mg | 27.07 gm | 26.80 gm |
| CALCIUM d-PANTOTHENATE USP | 920 mg | 23.30 gm | 21.44 gm |
| FOLIC ACID USP | 920 mg | 1.46 gm | 1.34 gm |
| D-BIOTIN SUPPLEMENT 1% | 10 mg | 13.40 gm | 134.00 mg |
| GREEN TEA POWDER | 1000 mg | 120.00 gm | 120.00 gm |
| VANILLIC CRYSTALS | 1000 mg | 6.70 gm | 170 gm |
| WHEAT MEAL CARRIER | | 760.40 gm | |
| | | 1000.00 gm | |

USAGE: 2.5 Kg per Tonne Porcomega Pig Grower Supplement 005.

| PIG GROWER - PORCOMEGA* AND COMPLETE FEED VITAMIN ADDITION | | |
|---|---|---|
| COMPOSITION INGREDIENT | ACTIVE/ Tonne PORCOMEGA* | ACTIVE/ Kg COMPLETE FEED |
| VITAMIN A-500 | 50.250.000 IU | 7.538 IU |
| VITAMIN D3-500 | 10.050.000 IU | 1.508 IU |

PIG GROWER - PORCOMEGA* AND COMPLETE FEED VITAMIN ADDITION

| COMPOSITION INGREDIENT | ACTIVE/ Tonne PORCOMEGA* | ACTIVE/ Kg COMPLETE FEED |
|---|---|---|
| VITAMIN E-50% | 67.000 IU | 10 IU |
| VITAMIN K3 | 6.70 gm | 1.00 mg |
| THIAMINE HYDROCHLORIDE USP | 6.70 gm | 1.00 mg |
| RIBOFLAVIN 95% F.G. | 16.75 gm | 2.51 mg |
| PYRIDOXINE USP | 6.70 gm | 1.00 mg |
| VITAMIN B 12- SUPPLEMENT 1% | 67.00 mg | 10.05 mg |
| NIACIN USP | 67.00 gm | 10.05 mg |
| CALCIUM d-PANTOTHENATE USP | 53.60 gm | 8.04 mg |
| FOLIC ACID USP | 335 gm | 0.50 mg |
| D-BIOTIN SUPPLEMENT 1% | 335.00 mg | 50.25 mg |
| GREEN TEA POWDER | 300.00 gm | 45.00 gm |
| VANILLIC CRYSTALS | 16.75 gm | 2.51 mg |

PIG GROWER MINERAL PREMIX PM 005

| COMPOSITION INGREDIENT | POTENCY/GM | FORMULA | ACTIVE/ KgPREMIX |
|---|---|---|---|
| FERROUS SULPHATE (FeS04.H20) | 310.0 mg | 216.125 gm | 67.000 gm |
| ZINC SULPHATE | 360.0 mg | 186.110 gm | 67.000 gm |
| MANGANESE SULPHATE (MnS04H2O) | 280.0 mg | 95.715 gm | 26.800 gm |
| POTASSIUM IODIDE(STAB) | 68.8 mg | 0.488 gm | 0335 gm |
| COBALT CARBONATE | 460.0 mg | 0.728 gm | 0.335 gm |
| COPPER SULPHATE | 250.0 mg | 13.400 gm | 3.350 gm |
| SODIUM SELENITE | 400.0 mg | 0.251 gm | 0.101 gm |
| LIMESTONE CARRIER | 1000.0 mg | 487.183 gm | 487.183 gm |
|  |  | 1000.000 gm |  |

USAGE: 10K per Tonne Porcomega* Pig Grower Supplement 005.

PIG GROWER PORCOMEGA* AND COMPLETE FEED MINERAL ADDITION

| COMPOSITION INGREDIENT | ACTIVE Tonne PORCOMEGAS | ACTIVE/ Kg COMPLETE FEED |
|---|---|---|
| FERROUS SULPHATE-Fe (FeS04.H20) | 670.00 gm | 100.500 mg |
| ZINC SULPHATE-Zn | 670.00 gm | 100.500 mg |
| MANGANESE SULPHATE-Mn (MnSO4.H2O) | 268.00 gm | 40.200 mg |
| POTASSIUM IODIDE(STAB).I | 3.35 gm | 0.502 mg |
| COBALT CARBONATE-Co | 3.35 gm | 0.502 mg |
| COPPER SULPFIATE-Cu | 33.50 gm | 5.025 mg |
| SODIUM SELENITE-Se | 1.01 gm | 0.151 mg |

PORCOMEGA PIG GROWER SUPPLEMENT 005. THEORETICAL ANALYSES TAB

| D.E. KJ/Kg | CALCIUM % |
| CRUDE FIBRE % | PHOSPHORUS (Total) % |

PORCOMEGA PIG GROWER SUPPLEMENT 005. THEORETICAL ANALYSES TAB

CRUDE PROTEIN %
CRUDE FAT %
LYSINE (Total) %
LYSINE (Avail) %
METHIONINE %
METH. + CYSTINE %
ARGMINE %
GLYCINE %
ISOLEUCINE %
LEUCINE %
THREONINE %
TRYPTOPHAN %
1-HSTIDINE %
PHENYLALANINE %
PHENYL. + TYROSINE %
SERINE %
VALINE %
FATTY ACIDS
LINOLEIC ACID %
LINOLENIC ACID %
w-3
EPA %.
DHA %

6. FORMULA PER TONNE PORCOMEGA* PIG FINISHER 006 #

|  | kg | % |
|---|---|---|
| PORCOMEG BASE SP | 987.50 | 97.080 |
| VITAMIN PREMIX PV 006 | 2.50 | 0.250 |
| MINERAL PREMIX PM 006 | 10.00 | 1.000 |
|  | 1000.00 | 100.000 |

USAGE:- 150 KG PER TONNE OF PIG FINISHER DIET 006.

PIG FINISHER VITAMIN PREMIX PV O06

| COMPOSITION INGREDIENT | POTENCY/Gm | FORMULA | ACTIVE/ Kg PREMIX |
|---|---|---|---|
| VITAMIN A-500 | 500.000 IU | 26.8 gm | 13.400.000 IU. |
| VITAMIN D3-500 | 500.000 IU | 5.36 gm | 2.680.000 IU. |
| VITAMIN E-50% | 500 IU | 53.6 gm | 26.800.0 IU. |
| VITAMIN K3 | 1000 mg | 2.68 gm | 2.68 gm |
| THIAMINE I-IYDROCHLORIDE USP | 892 mg | 3.00 gm | 2.68 gm |
| RIBOFLAVIN 95% F.G. | 950 mg | 5.64 gm | 5.36 gm |
| PYRIDOXINE USP | 823 mg | 4.88 gm | 2.68 gm |
| VITAMIN B 12- SUPPLEMENT 1% | 10 mg | 1.34 gm | 13.40 mg |
| NIACIN USP | 990 mg | 18.95 gm | 18.76 gm |
| CALCIUM D-PANTOTHENATE USP | 920 mg | 20.39 gm | 18.76 gm |
| FOLIC ACID USP | 920 mg | 1.46 gm | 1.34 gm |
| D-BIOTIN- SUPPLEMENT 1% | 10 mg | 1340 gm | 134.00 mg |
| GREEN TEA POWDER | 1000 mg | 120.00 gm | 120.00 gm |
| VANILLIC CRYSTALS | 1000 mg | 4.02 gm | 4.02 gm |
| WHEAT MEAL (CARRIER) | 1000 mg | 760.40 gm |  |
|  |  | 1000.00 gm |  |

USAGE: 2.5 Kg per Tonne Porcomega Finisher Supplement 006.

| PIG FINISHER - PORCOMEGA* AND COMPLETE FEED VITAMIN ADDITION ||| |
| --- | --- | --- |
| COMPOSITION INGREDIENT INGREDIENT | ACTIVE/ Tonne PORCOMEGA* | ACTIVE/ Kg COMPLETE FEED |
| VITAMIN A-500 | 33.500.000 IU | 5.025 IU |
| VITAMIN D3-500 | 6.700.000 IU | 1.005 IU |
| VITAMIN E-50% | 67.000 IU | 10.05 IU |
| VITAMIN K3 | 6.70 gm | 1.01 mg |
| THIAMINE HYDROCHLORIDE USP | 6.70 gm | 1.01 mg |
| RIBOFLAVIN 95% F.G. | 13.40 gm | 2.01 mg |
| PYRIDOXINE USP | 6.70 gm | 1.01 mg |
| VITAMIN B12-SUPPLEMENT 1% | 33.50 mg | 5.03 mg |
| NIACIN USP | 46.90 gm | 7.04 mg |
| CALCIUM d-PANTOTHENATE USP | 46.90 gm | 7.04 mg |
| FOLIC ACID USP | 3.35 gm. | 0.50 mg |
| D-BIOTIN SUPPLEMENT 1% | 335.00 mg | 50.00 mcg |
| GREEN TEA POWDER | 300 gm | 45.00 mg |
| VANILLIC CRYSTALS | 10.05 gm | 1.51 mg |

| PIG FINISHER MINERAL PREMIX PM 006 |||| |
| --- | --- | --- | --- |
| COMPOSITION INGREDIENT | POTENCY/ GM | FORMULA | ACTIVE/ KgPREMIX |
| FERROUS SULPHATE (FeS04.H20) | 310.0 mg | 216.125 gm | 67.000 gm |
| ZINC SULPHATE | 360.0 mg | 186.110 gm | 87.000 gm |
| MANGANESE SULPHATE-(MnS04.H20) | 280.0 mg | 957 15 gm | 26.800 gm |
| POTASSIUM IODIDE(STAB) | 68.8 mg | 0.488 gm | 0.335 gm |
| COBALT CARBONATE | 460.0 m | 0.728 gm | 0.335 gm |
| COPPER SULPHATE | 250.0 mg | 13.400 gm | 3.350 gm |
| SODIUM SELENITE | 400.0 mg | 0.251 gm | 0.101 gm |
| LIMESTONE CARRIER | 1000.0 mg | 5.330 gm 1000.000 gm | 165.330 gm |

USAGE: 10 Kg per Tonne Porcomega* Finisher Supplement 006

| PIG FINISHER PORCOMEGA. AND COMPLETE FEED MINERAL ADDITION ||| |
| --- | --- | --- |
| COMPOSITION INGREDIENT | ACTIVE/Tonne PORCOMEGA | ACTIVE/kg COMPLETE FEED |
| FERROUS SULPHATE-Fe (FeS04.H20) | 670.00 gm | 100.500 rug |
| ZINC SULPHATE-Zn | 670.0 gm | 100.500 mg |
| MANGANESE SULPHATE-Mn (MnS04.H20) | 268.00 gm | 40.200 mg |
| POTASSIUM IODIDE (STAB)-I | 3.35 gm | 0.502 mg |
| COBALT CARBONATE-CO | 3.35 gm | 0502 mg |
| COPPER SULPFIATE-CU | 33.50 gm | 5025 mg |
| SODIUM SELENITE-Se | 1.01 gm | 0.15 1 mg |

What is claimed is:

1. A livestock feed supplement for inclusion in the diet of livestock prior to slaughter for the production of meat for human consumption, the feed supplement comprising:
   a) tuna meal as a source of omega 3 long chain fatty acids comprising docosahexaenoic acid (DHA);
   b) a plurality of antioxidants, wherein at least one antioxidant is selected from the group consisting of tert-butylhydroquinone; butylated hydroxyanisole; butylated hydroxytoluene; ethoxyquin vitamin grade; propyl gallate; ascorbic acid; crude palm oil; and combinations thereof, and at least one antioxidant is selected from the group consisting of Vitamin E, carotenoids, Vitamin C, Rosemary oil, thyme white oil, peppermint oil, Jasmine tea, sodium selenite, crude Canola oil, and combinations thereof; and
   c) an antibacterial agent, wherein the antibacterial agent is at least one member selected from the group consisting of potassium sorbate food acid, citric acid food acid, benzoic acid food preservative, and phosphoric acid;
   wherein the tuna meal is stabilized in the supplement to an extent that allows feeding of the tuna meal to a level constituting between 5% to 15% of the total dietary intake of the livestock; and allows feeding any time up to and including immediately prior to slaughter of the livestock for meat produce thereby achieving enrichment of DHA in the meat produce without the tuna meal adversely affecting the sensory qualities of the meat produce so that when consumed they are free of fishy taint.

2. A livestock feed supplement according to claim 1, wherein the supplement in addition to tuna meal comprises a blend of:
   an oil based premix,
   a dry mix premix, and
   a water-based green tea extract.

3. A livestock feed supplement according to claim 2, wherein the oil based premix comprises a blend of the following ingredients:
   Ethoxyquin vitamin grade;
   Crude palm oil;
   Crude Canola oil Carrier;
   Aniseed China Star;
   Rosemary oil;
   Thyme white oil;
   Peppermint oil;
   Benzoic Acid; and
   Phosphoric Acid 81%.

4. A livestock feed supplement according to claim 2, wherein the dry mix premix comprises a blend of the following ingredients:
   Vitamin E;
   Vitamin C;
   Citric Acid;
   Propyl Gallate;
   Calcium Propionate; and
   Wheat Meal Carrier.

5. A livestock feed supplement according to claim 2, wherein the tuna meal, oil based premix, dry mix premix and water based green tea extract are blended in the following proportions:

|  | kg | % |
| --- | --- | --- |
| Fish Meal | 983.00 | 98.300 |
| Oil based premix | 10.00 | 1.000 |
| Dry mix Premix | 5.00 | 0.500 |
| Water based infused green tea extract | 2.00 | 0.200 |
|  | 1000.00 | 100.000. |

6. A livestock feed supplement according to claim 5, wherein the constituents of the oil based premix per ton of a food base are blended in the following proportions:

|  | kg | % |
|---|---|---|
| Ethoxyquin vitamin grade | 0.400 | 4.00 |
| Crude palm oil | 1.500 | 15.00 |
| Aniseed China Star | 0.067 | 0.67 |
| Rosemary oil | 0.100 | 1.00 |
| Thyme white oil | 0.100 | 1.00 |
| Peppermint oil | 0.150 | 1.50 |
| Benzoic Acid | 0.005 | 0.05 |
| Phosphoric Acid 81% | 0.250 | 2.50 |
| Crude Canola oil Carrier | 7.428 | 74.28 |
|  | 10.000 | 100.00. |

7. A livestock feed supplement according to claim 6, wherein the constituents of the dry mix premix per ton of food base are blended in the following proportions:

|  | kg | % |
|---|---|---|
| Vitamin E 50 | 0.800 | 16.00 |
| Vitamin C | 0.500 | 10.00 |
| Citric Acid | 0.500 | 10.00 |
| Propyl Gallate | 0.100 | 2.00 |
| Calcium Propionate | 0.500 | 10.00 |
| Wheat Meal Carrier | 2.600 | 52.00 |
|  | 5.000 | 100.00. |

8. A livestock feed supplement according to claim 7, wherein the Vitamin C and Citric Acid are scavenger antioxidants.

9. A livestock feed supplement according to claim 1, wherein the supplement supplies in addition to the Docosahexaenoic Acid, the long chain fatty acids Docosapentaenoic acid, and Eicosapentaenoic acid to the meat products derived from slaughter of the livestock.

10. A livestock feed supplement according to claim 1, wherein the percentage of feed supplement comprises 15% of the total dietary intake of the animal.

11. A livestock feed supplement according to claim 1, wherein the meat produce comprises pork, poultry meat, lamb, eggs, beef, or farmed fish.

12. A livestock feed supplement according to claim 1, further comprising an anti-mold or anti-fungal agent which comprises calcium propionate.

13. A livestock feed supplement according to claim 2, wherein the oil based premix, dry mix premix, and water based green tea extract comprise the following constituents:
Ethoxyquin vitamin grade;
Propyl Gallate;
Vitamin C;
Crude palm oil;
Crude Canola oil Carrier;
Aniseed China Star;
Rosemary oil;
Thyme white oil;
Peppermint oil;
Vitamin E 50;
Benzoic Acid;
Phosphoric Acid 81%;
Citric Acid;
Calcium propionate;
Water based green tea extract; and
Wheat Meal Carrier.

14. A livestock feed supplement according to claim 13, wherein the tuna meal, oil based premix, dry mix premix, and water based green tea extract are blended in the following proportions per ton of food base:

|  | kg | % |
|---|---|---|
| Tuna Meal | 985.000 | 98.500 |
| Ethoxyquin vitamin grade | 0.400 | 0.040 |
| Crude palm oil | 1.500 | 0.150 |
| Crude Canola oil Carrier | 7.428 | 0.743 |
| Vitamin C | 0.500 | 0.050 |
| Propyl Gallate | 0.100 | 0.010 |
| Aniseed China Star | 0.067 | 0.007 |
| Rosemary oil | 0.100 | 0.010 |
| Thyme white oil | 0.100 | 0.010 |
| Peppermint oil | 0.150 | 0.015 |
| Vitamin E 50 | 0.800 | 0.080 |
| Benzoic Acid | 0.005 | 0.001 |
| Phosphoric Acid 81% | 0.250 | 0.025 |
| Citric Acid | 0.500 | 0.050 |
| Calcium Propionate | 0.500 | 0.050 |
| Water based green tea extract | 2.00 | 0.200 |
| Wheat Meal Carrier | 2.600 | 0.260 |
|  | 1000.000 | 100.00. |

15. A livestock feed supplement according to claim 14, wherein the supplement further comprises in the following constituent proportion:

|  | % |
|---|---|
| Vanillic Crystals | 0.013. |

16. A method of feeding livestock prior to slaughter of the livestock for production of meat for human consumption, the method comprising the steps of:
a) preparing an animal feed supplement for inclusion in the diet of livestock by:
i) selecting tuna meal as a source of omega 3 long chain fatty acids comprising Docosahexaenoic Acid (DHA);
ii) selecting a plurality of antioxidants, wherein at least one antioxidant is selected from the group consisting of tert-butylhydroquinone; butylated hydroxyanisole; butylated hydroxytoluene; ethoxyquin vitamin grade; propyl gallate; ascorbic acid; crude palm oil; and combinations thereof, and at least one antioxidant is selected from the group consisting of Vitamin E, carotenoids, Vitamin C, Rosemary oil, thyme white oil, peppermint oil, Jasmine tea, sodium selenite, crude Canola oil, and combinations thereof; and
iii) selecting an antibacterial agent, wherein the antibacterial agent is at least one member selected from the group consisting of potassium sorbate food acid, citric acid food acid, benzoic acid food preservative, and phosphoric acid;
and blending the tuna meal, the antioxidants, and the antibacterial agent, wherein the tuna meal is stabilized in the supplement sufficient to allow feeding of the tuna meal to a level comprising between 5% to 15% of the total dietary intake of the livestock; and b) feeding the livestock with the supplement up to and immediately prior to slaughter; thereby achieving enrichment of DHA in the meat products without the tuna meal affecting the sensory qualities of the meat products so that when consumed the meat products are free of fishy taint.

17. A method of feeding livestock using a tuna meal-based feed supplement, for inclusion in the diet of livestock prior to slaughter for the production of meat for human consumption the method comprising the steps of:
   a) selecting tuna meal as a source of omega-3 fatty acids comprising Docosahexaenoic Acid (DHA);
   b) selecting a plurality of antioxidants, wherein at least one antioxidant is selected from the group consisting of tert-butylhydroquinone; butylated hydroxyanisole; butylated hydroxytoluene; ethoxyquin vitamin grade; propyl gallate; ascorbic acid; crude palm oil; and combinations thereof, and at least one antioxidant is selected from the group consisting of Vitamin E, carotenoids, Vitamin C, Rosemary oil, thyme white oil, peppermint oil, Jasmine tea, sodium selenite, crude Canola oil, and combinations thereof;
   c) selecting an antibacterial agent, wherein the antibacterial agent is at least one member selected from the group consisting of potassium sorbate food acid, citric acid food acid, benzoic acid food preservative, and phosphoric acid;
   d) blending the constituents in steps a), b) and c) above to form a tuna meal feed supplement;
   e) feeding the supplement to livestock to a level of tuna meal between 5% to 15% of the total dietary intake of the livestock; and
   f) feeding the livestock with the supplement up to immediately prior to slaughter of the livestock;
   wherein the tuna meal is stabilized in the supplement to an extent that allows feeding of the supplement any time up to and including immediately prior to slaughter thereby achieving enrichment of DHA in the meat produce without the tuna meal adversely affecting the sensory qualities of meat products so that when consumed the meat products are free of fishy taint.

18. A method according to claim 17, further comprising the step during preparation of the tuna meal supplement of forming an oil based premix by blending the following constituents:
   Ethoxyquin vitamin grade;
   Crude palm oil;
   Crude Canola oil Carrier;
   Aniseed China Star;
   Rosemary oil;
   Thyme white oil;
   Peppermint oil;
   Benzoic Acid; and
   Phosphoric Acid 81%.

19. A method according to claim 18, further comprising the step during preparation of the tuna meal supplement of forming a dry mix premix from the following ingredients:
   Vitamin E;
   Vitamin C;
   Citric Acid;
   Propyl Gallate;
   Calcium Propionate; and
   Wheat Meal Carriers.

20. A method according to claim 19, comprising blending the tuna meal, the oil based premix, the dry mix premix, and a water based green tea extract together.

21. A method according to claim 20, further comprising mixing the tuna meal, oil based premix, dry mix premix and water based green tea extract in the following proportions:

|  | kg | % |
| --- | --- | --- |
| Fish Meal | 983.00 | 98.300 |
| Oil based premix | 10.00 | 1.000 |
| Dry mix Premix | 5.00 | 0.500 |
| Water based infused green tea extract | 2.00 | 0.200 |
|  | 1000.00 | 100.000. |

22. A method according to claim 21, further comprising blending the oil based premix per ton of a food base in the following proportions:

|  | kg | % |
| --- | --- | --- |
| Ethoxyquin vitamin grade | 0.400 | 4.00 |
| Crude palm oil | 1.500 | 15.00 |
| Aniseed China Star | 0.067 | 0.67 |
| Rosemary oil | 0.100 | 1.00 |
| Thyme white oil | 0.100 | 1.00 |
| Peppermint oil | 0.150 | 1.50 |
| Benzoic Acid | 0.005 | 0.05 |
| Phosphoric Acid 81% | 0.250 | 2.50 |
| Crude Canola oil Carrier | 7.428 | 74.28 |
|  | 10.000 | 100.00. |

23. A method according to claim 21, comprising blending the dry mix premix per ton of food base in the following proportions:

|  | kg | % |
| --- | --- | --- |
| Vitamin E 50 | 0.800 | 16.00 |
| Vitamin C | 0.500 | 10.00 |
| Citric Acid | 0.500 | 10.00 |
| Propyl Gallate | 0.100 | 2.00 |
| Calcium Propionate | 0.500 | 10.00 |
| Wheat Meal Carrier | 2.600 | 52.00 |
|  | 5.000 | 100.00. |

24. A method of feeding livestock using a tuna meal-based feed supplement, for inclusion in the diet of livestock prior to slaughter for the production of meat for human consumption the method comprising the steps of:
   a) selecting tuna meal as a source of omega-3 fatty acids comprising Docosahexaenoic Acid (DHA);
   b) selecting a mixture of antioxidants, wherein at least one antioxidant is selected from the group consisting of tert-butylhydroquinone; butylated hydroxyanisole; butylated hydroxytoluene; ethoxyquin vitamin grade; propyl gallate; ascorbic acid; crude palm oil; and combinations thereof, and at least one antioxidant is selected from the group consisting of Vitamin E, carotenoids, Vitamin C, Rosemary oil, thyme white oil, peppermint oil, Jasmine tea, sodium selenite, crude Canola oil, and combinations thereof;
   c) selecting an antimicrobial agent comprising at least one member selected from the group consisting of potassium sorbate food acid, citric acid food acid, benzoic acid food preservative, phosphoric acid, and combinations thereof;

d) preparing a dry mix premix and an oil based premix;

e) blending at least the constituents in a), b), c), and d) above to form a tuna meal feed supplement including the oil based premix, the dry mix premix and a water based green tea extract, in predetermined proportions of the supplement;

f) selecting additives for the supplement appropriate to the stage of development of the livestock to which the supplement is fed, and g) blending the additives with the tuna meal, dry mix premix, oil based premix and water based green tea extract;

h) feeding the supplement to livestock to a tuna meal level between 5% to 15% of the total dietary food intake of the livestock; and i) feeding the livestock with the supplement up to immediately prior to slaughter of the livestock;

wherein the tuna meal is stabilized in the supplement to an extent that allows feeding of the supplement any time up to and including immediately prior to slaughter thereby achieving enrichment of DHA in the meat produce without the tuna meal adversely affecting the sensory qualities of meat products so that when consumed, the meat products are free of fishy taint.

25. A method according to claim 24, wherein the feed supplement comprises 15% of the dietary intake of the livestock.

* * * * *